US010994325B2

(12) United States Patent
Ikuta et al.

(10) Patent No.: US 10,994,325 B2
(45) Date of Patent: May 4, 2021

(54) FASTENING TOOL

(71) Applicant: MAKITA CORPORATION, Anjo (JP)

(72) Inventors: Hiroki Ikuta, Anjo (JP); Toshihito Yabunaka, Anjo (JP); Takao Kuroyanagi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 192 days.

(21) Appl. No.: 16/472,924

(22) PCT Filed: Dec. 19, 2017

(86) PCT No.: PCT/JP2017/045603
§ 371 (c)(1),
(2) Date: Jun. 24, 2019

(87) PCT Pub. No.: WO2018/123744
PCT Pub. Date: Jul. 5, 2018

(65) Prior Publication Data
US 2019/0314888 A1 Oct. 17, 2019

(30) Foreign Application Priority Data

Dec. 28, 2016 (JP) .............................. JP2016-255957
Dec. 28, 2016 (JP) .............................. JP2016-255962

(51) Int. Cl.
*B21J 15/26* (2006.01)
*B21J 15/04* (2006.01)
(Continued)

(52) U.S. Cl.
CPC ............. *B21J 15/26* (2013.01); *B21J 15/022* (2013.01); *B21J 15/04* (2013.01); *B21J 15/105* (2013.01);
(Continued)

(58) Field of Classification Search
CPC ...... B21J 15/022; B21J 15/045; B21J 15/105; B21J 15/26; B21J 15/28–285; B21J 15/326
See application file for complete search history.

(56) References Cited

U.S. PATENT DOCUMENTS 4,790,470 A * 12/1988 Miles ....................... B21J 15/28
227/1
5,131,255 A 7/1992 Fushiya et al.
(Continued)

FOREIGN PATENT DOCUMENTS

| EP | 2 050 525 A1 | 4/2009 |
|----|-----|-----|
| JP | S52-131697 U | 10/1977 |
| WO | 02/23056 A1 | 3/2002 |

OTHER PUBLICATIONS

Apr. 20, 2020 Chinese Office Action issued in Chinese Patent Application No. 201780080833.5.
(Continued)

*Primary Examiner* — Matthew P Travers
(74) *Attorney, Agent, or Firm* — Oliff PLC

(57) ABSTRACT

A fastening tool configured to fasten a workpiece via a multi-piece swage type fastener including a pin and a collar includes an anvil, a pin-gripping part, a driving mechanism, an electric motor, a control part and a housing. The driving mechanism is configured to move the pin-gripping part relative to the anvil in a first direction along an axis so as to cause the anvil to press the collar engaged with a shaft part of the pin in a second direction and in a radially inward direction. An operation mode of the driving mechanism can be selectively switched between a plurality of operation modes including a first mode, in which a process of fastening the workpiece is completed based on a state of the
(Continued)

fastener, and a second mode, in which the process of fastening the workpiece is completed based on a driving state of the motor.

13 Claims, 15 Drawing Sheets

(51) Int. Cl.
  *B21J 15/10* (2006.01)
  *B21J 15/36* (2006.01)
  *B21J 15/28* (2006.01)
  *B21J 15/02* (2006.01)
  *B21J 15/32* (2006.01)

(52) U.S. Cl.
  CPC ............. *B21J 15/285* (2013.01); *B21J 15/36* (2013.01); *B21J 15/326* (2013.01)

(56) References Cited

U.S. PATENT DOCUMENTS

| | | | | |
|---|---|---|---|---|
| 5,315,755 A | | 5/1994 | Fulbright et al. | |
| 5,655,289 A | * | 8/1997 | Wille | B21J 15/26 29/243.53 |
| 6,145,360 A | * | 11/2000 | Honsel | B21J 15/26 72/19.8 |
| 2007/0175010 A1 | * | 8/2007 | Wang | B21J 15/285 29/243.521 |
| 2007/0271764 A1 | * | 11/2007 | Stevenson | B21J 15/50 29/522.1 |
| 2009/0101689 A1 | | 4/2009 | Wille | |
| 2009/0112925 A1 | * | 4/2009 | Amirehteshami | B25B 27/0014 |
| 2015/0251240 A1 | * | 9/2015 | LeMieux | B21J 15/142 29/715 |
| 2016/0045950 A1 | * | 2/2016 | Gaertner | B21J 15/285 29/407.05 |
| 2017/0173662 A1 | * | 6/2017 | Honsel | B21J 15/26 |

OTHER PUBLICATIONS

Jan. 30, 2018 International Search Report issued in International Patent Application No. PCT/JP2017/045603.
Aug. 5, 2020 Extended European Search Report issued in European Patent Application No. 17887908.6.

\* cited by examiner

FASTENING TOOL

TECHNICAL FIELD

The present invention relates to a fastening tool for fastening a workpiece via a fastener which includes a pin having a shaft part and a head, and a hollow cylindrical collar which can be engaged with the shaft part of the pin.

BACKGROUND ART

As a fastener for firmly fixing a plurality of workpieces in close contact with each other, a fastener is known which includes a pin (which may also referred to as a bolt) and a collar which are separately formed from each other. In fastening workpieces by using such a fastener, first, the pin is inserted through mounting holes formed in the workpieces and then the collar is engaged with a shaft part of the pin. Thereafter, a region of the shaft part including an end on the side opposite to a head of the shaft part is gripped and pulled in an axial direction by the fastening tool. Thus, the head and the collar clamp the workpieces therebetween and the collar is swaged to the shaft part such that an inner periphery of the collar is crimped to a groove formed in the shaft part. Therefore, the fastener having the above-described structure is also referred to as a multi-piece swage type fastener.

The following two types of multi-piece swage type fasteners are typically known. The first type fastener includes a pin, in which a small-diameter part for breakage different from a groove for swaging is formed in a shaft part. A portion of the shaft part on the side opposite to a head across the small-diameter part is generally referred to as a pintail. In an operation of fastening the workpieces by using the first type fastener, when the collar is swaged to the shaft part, the shaft part is broken at the small-diameter part and the pintail gripped by the fastening tool is separated, the fastening operation is completed. The second type fastener does not have a small-diameter part (in other words, does not have a pintail) in a shaft part and includes a shorter pin than that of the first type. In an operation of fastening the workpieces by using the second type fastener, when the collar is swaged to the shaft part, the fastening operation is completed while an end region of the shaft part remains gripped by the fastening tool and integrated with the shaft part. In other words, it is not assumed that the pin is to be broken in the second type fastener. In consideration of this difference, the first type and the second type may also be referred to as a breakage type (or tear-off type, pintail separation type) and a non-breakage type (or shaft retaining type), respectively.

PCT International Publication No. WO 2002/023056 discloses a fastening tool for fastening workpieces by using a non-breakage type fastener. The fastening tool includes a rotary nut member configured to grip an end region of a shaft part of a pin, and an anvil configured to be engaged with a collar. Further, the fastening tool moves a piston disposed within a cylinder by fluid pressure to move the anvil in an axial direction relative to the rotary nut member. Thus, the anvil presses and swages the collar to the shaft part.

SUMMARY OF THE INVENTION

Problems to be Solved by the Invention

The above-described fastening tool for the non-breakage type fastener completes a fastening process based on back pressure which is generated in fluid along with progress of swaging operation. This fastening tool controls output by utilizing fluid pressure, so that output management can be easily performed, but it is difficult to make the device structure simple and compact. Further, it is also desired to use a breakage type fastener as well on a single fastening tool.

Accordingly, it is an object of the present invention to provide a fastening tool for fastening a workpiece via a multi-piece swage type fastener, and more particularly, a fastening tool which can use both a breakage type fastener and a non-breakage type fastener while being made compact in structure.

Embodiment to Solve the Problem

According to one aspect of the present invention, a fastening tool is provided which is configured to fasten a workpiece via a multi-piece swage type fastener, which includes a pin (which may also be referred to as a bolt) and a collar. The pin includes a shaft part and a head. The shaft part has a swaging groove, and the head is integrally formed on one end of the shaft part. The collar has a hollow cylindrical shape and is engageable with the shaft part. The fastening tool includes an anvil, a pin-gripping part, a driving mechanism, a motor, a control part and a housing. The anvil is configured to be engaged with the collar. The pin-gripping part is configured to grip the shaft part of the pin. Further, the pin-gripping part is held by the anvil so as to be movable relative to the anvil along a specified axis. The driving mechanism is configured to move the pin-gripping part relative to the anvil along the axis. The motor is an electric motor and configured to drive the driving mechanism. The control part is configured to control operation of the driving mechanism via the motor. The housing is configured to hold the anvil and houses the motor, the control part and at least a portion of the driving mechanism.

The driving mechanism is configured to move the pin-gripping part relative to the anvil in a first direction along the axis so as to cause the anvil to press the collar engaged with the shaft part in a second direction opposite to the first direction and in a radially inward direction of the collar, thereby swaging the collar to the groove and fastening the workpiece by the head and the collar. An operation mode of the driving mechanism can be selectively switched between a plurality of operation modes including a first mode and a second mode. In the first mode, a process of fastening the workpiece is completed based on a state of the fastener. In the second mode, the process of fastening the workpiece is completed based on a driving state of the motor.

In the fastening tool of the present aspect, the driving mechanism is driven by the motor, so that the structure of the whole fastening tool can be made compact, compared with a structure in which a driving mechanism utilizing fluid pressure is employed.

Typical examples of the multi-piece swage type fastener which can be used for the fastening tool of the present aspect may include the breakage type fastener and the non-breakage type fastener which are described above. The operation mode of the driving mechanism can be selectively switched between the first mode and the second mode. In the first mode in which the fastening process is completed simply based on the state of the fastener, the breakage type fastener, of which the pin is allowed to be broken, can be used, but the non-breakage type fastener, of which the pin is not assumed to be broken, cannot be used. Therefore, in the present aspect, focusing on the fact that the driving state of the motor changes as the relative axial force applied to the pin and the collar increases along with progress of the swaging operation when the driving mechanism is driven by the motor, the second mode is provided in which the non-breakage type fastener can be used. Thus, the fastening tool of the present aspect can use either the breakage type fastener or the non-breakage type fastener by switching the operation mode.

The structure of the anvil is not particularly limited as long as the anvil can be engaged with the collar of the multi-piece swage type fastener. Typically, the anvil may be configured as a metal anvil capable of deforming the collar by a swaging force, and may have a bore (open hollow part). Preferably, the bore may include a tapered part which is configured to gradually increase in diameter toward an open end from which the collar is inserted and to have a smaller diameter than the outer diameter of a region of the collar to be swaged. With such a structure, the collar can be pressed in the second direction within the tapered part, in abutment with an inner peripheral surface of the anvil, as the pin-gripping part moves in the first direction relative to the anvil, and further inserted into the bore of the anvil while being compressed and deformed in the radial direction. As a result, the collar can be swaged to the shaft part while being crimped into the swaging groove and the workpiece can be fastened by the head of the pin and the collar.

The anvil may be held by the housing by being connected to the housing directly or via a separate member. Further, the anvil may be configured to be removable from the housing.

The structure of the pin-gripping part is not particularly limited as long as the pin-gripping part is configured to grip the shaft part of the pin and held by the anvil so as to be movable along the specified axis relative to the anvil. Typically, the gripping part may include a plurality of claws (also referred to as a jaw) configured to grip a portion of the shaft part of the pin, and a holding body for holding the claws. The pin-gripping part having such a structure may be coaxially disposed with the anvil within the bore of the anvil.

The driving mechanism may have any structure capable of moving the pin-gripping part along the axis relative to the anvil. For example, the driving mechanism may have any structure capable of finally converting rotation of the motor, which serves as a driving source, into axial linear motion of the pin-gripping part. Specifically, for example, the driving mechanism may include a ball-screw mechanism having a screw shaft and a nut. In this case, the pin-gripping part may be directly or indirectly connected to the screw shaft so as to be axially movable together with the screw shaft. Apart from the ball-screw mechanism, for example, a rack and pinion mechanism may also be adopted.

The motor may be either a direct current (DC) motor or an alternate current (AC) motor, and presence or absence of a brush of the motor is not particularly limited. A brushless DC motor may be preferable in terms of being compact and having high output.

As the control part, typically, a control circuit may be employed. The control circuit may be formed, for example, by a microcomputer including a CPU, a ROM and a RAM or a programmable logic device such as an ASIC (Application Specific Integrated Circuit) and an FPGA (Field Programmable Gate Array).

The housing may also be referred to as a tool body. The housing may have a one-layer structure or a two-layer structure. The housing of one-layer structure may be formed by connecting a plurality of parts. The housing of two-layer structure may typically includes an outer housing part which forms an outer shell of the fastening tool and an inner housing part which is at least partially housed in the outer housing and at least partially houses internal components. In the case of the two-layer structure, both the outer housing part and the inner housing part may be formed by connecting a plurality of parts.

The manner of selectively switching the operation mode of the driving mechanism may include a manner in which the control part controls operation of the driving mechanism according to an operation mode selected via an operation member which can be externally operated by a user, a manner of mechanically switching the operation mode of the driving mechanism via an operation member, and a manner in which the control part selects an adequate operation mode according to the type of the fastener and controls operation of the driving mechanism.

In the first mode, the driving mechanism may complete the fastening operation, for example, when the fastener is deformed into a specified shape. Specifically, for example, for the breakage type fastener which can be used for the fastening tool, the driving mechanism may be configured to operate to apply to the pin-gripping part a specified axial force (pulling force) which is larger than a force required to swage the collar to the shaft part and large enough to break the shaft part at the small-diameter part. For example, the driving mechanism may move the pin-gripping part relative to the anvil to a specified position in which a pulling force which is larger than the specified pulling force can be applied. In the second mode, the driving mechanism may complete the fastening operation, for example, when the motor is brought into a driving state corresponding to a state in which the collar has been swaged to the shaft part. The plurality of operation modes of the driving mechanism may include at least the first and second modes and may include one or more other operation modes.

As the driving state of the motor, for example, a physical quantity which corresponds to a load on the motor which changes along with progress of the swaging operation can be suitably adopted. An example of such physical quantities may be driving current of the motor. Further, when a rechargeable battery is employed as a power source of the fastening tool, for example, an internal resistance value or a voltage drop value of the battery may also be adopted as the physical quantity. To "complete fastening based on the driving state" may mean to complete fastening, for example, when the value of a physical quantity used as the driving state (physical quantity indicative of the driving state) becomes higher (or lower) than a preset threshold, or when the amount of change of such a physical quantity per unit time becomes larger (or smaller) than a preset threshold.

According to one aspect of the present invention, the first mode may be an operation mode for a breakage type fastener of which the shaft part has a small-diameter part for breakage. When the first mode is selected, the fastening process may be completed when the pin is broken at the small-diameter part while a pintail is gripped by the pin-gripping part and separated from the pin. The pintail is a region of the shaft part on the side opposite to the head across the small-diameter part. The second mode may be an operation mode for a non-breakage type fastener of which the shaft part does not have a small-diameter part for breakage. When the second mode is selected, the fastening process may be completed while an end region of the shaft part remains gripped by the pin-gripping part and integrated with the other region of the shaft part.

According to the present aspect, the first mode and the second mode can be defined as operation modes which correspond to the breakage type fastener and the non-breakage type fastener, respectively. Therefore, the operation mode for the type of the fastener to be used can be reliably selected.

According to one aspect of the present invention, the fastening tool may further include a driving-state detecting part configured to detect the driving state of the motor. The control part may be configured to control the motor based on the driving state detected by the driving-state detecting part only when the second mode is selected, and thereby terminate a movement of the pin-gripping part in the first direction relative to the anvil via the driving mechanism to complete the fastening process.

According to the present aspect, control based on the detected driving state of the motor may be performed only when the second mode is selected for the non-breakage type fastener which requires close output management of the motor, while the control based on the driving state of the motor may not be performed when the first mode for the breakage type fastener is selected. According to the present aspect, the control part can complete the fastening process by appropriately operating the driving mechanism according to which one of the first mode for the breakage type and the second mode for the non-breakage type fastener is selected.

According to one aspect of the present invention, the fastening tool may further include a collection passage, a container connection part and a container detecting part. The collection passage may communicate with an internal passage, which is formed along the axis within the pin-gripping part, and extend to an outlet formed in the housing. Further, the collection passage may be configured such that the separated pintail can pass therethrough. The container connection part may be provided around the outlet and configured such that a collection container is removably mounted thereto. The collection container may be configured to store the pintail. The container detecting part may be configured to detect the collection container via the container connection part at least when the first mode is selected.

According to the present aspect, when the breakage type fastener is used, the pintail which has been separated from the shaft part and passed through the collection passage can be stored in the collection container mounted to the container connection part. When the collection container is not necessary, such as when the non-breakage type fastener of which the shaft part is not to be broken is used and when the fastening tool is stored, the collection container can be removed to make the fastening tool compact. Further, with the structure in which the collection container is detected by the container detecting part at least when the first mode is selected, by utilizing the detection results, processing such as indicating by light, sound or image and prohibiting driving of the driving mechanism can be appropriately performed when the collection container is not mounted. Thus, the pintail can be prevented from being discharged from the outlet to the outside when not intended by a user.

In the present aspect, the collection passage may extend in any direction from the internal passage of the pin-gripping part to the outlet of the housing. In view of smooth discharge of the pintail, however, it may be preferred that the collection passage extends substantially straight. The collection passage may preferably be surrounded by a wall, but need not necessarily be surrounded in its entirety in the circumferential direction over the whole length. Further, the diameter of the collection passage need not necessarily be uniform over the whole length. The shape and size of the collection container are not particularly limited. Further, the manner of mounting/dismounting the collection container to/from the container connection part is not particularly limited. For example, threaded engagement, engagement between a projection and a recess and bayonet coupling may be adopted. The structure of the container detecting part is not particularly limited. For example, any one of a contact switch which is turned on by contact with the collection container, and a non-contact sensor such as a magnetic proximity sensor and a photoelectric sensor may be adopted.

According to one aspect of the present invention, the driving mechanism may include a ball-screw mechanism including a screw shaft and a nut. The screw shaft may extend along the axis and may be held to be movable along the axis while rotation around the axis is restricted. The nut may be supported by the housing so as to be rotatable around the axis while movement in an extending direction of the axis is restricted. Further, the nut may be configured to be rotationally driven by the motor to move the screw shaft relative to the housing along the axis. The pin-gripping part may be directly or indirectly connected to the screw shaft. The collection passage may extend rearward from a front side of the fastening tool along the axis and at least partially extend within the screw shaft. The outlet may be formed in a rear end portion of the housing.

According to the present aspect, the collection passage may be provided to linearly extend along the axis through the screw shaft of the ball-screw mechanism, thereby allowing smooth passage of the pintail. Further, the collection container can be removably mounted to the rear end portion of the housing, and thus can be easily mounted/dismounted, compared with a case of the collection container disposed on an intermediate portion of the housing.

According to one aspect of the present invention, the fastening tool may further include an operation member which is configured to select any one of the operation modes according to external operation. The control part may be configured to control operation of the driving mechanism according to the operation mode selected via the operation member. According to the present aspect, a user can select a desired operation mode according to the type of the fastener to be used. The structure of the operation member is not particularly limited. For example, any one of a push-type switch, a rotary dial and a touch panel may be adopted.

According to one aspect of the present invention, the operation member may be configured to set, in addition to selecting the operation mode, a threshold relating to the driving state of the motor as a condition of completion of the fastening process in the second mode. The control part may be configured to control the motor based on a result of comparison between the threshold set via the operation member and the driving state, when the second mode is selected, and thereby cause the driving mechanism to terminate movement of the pin-gripping part in the first direction relative to the anvil. According to the present aspect, a user can appropriately set the threshold, for example, according to the strength of the workpiece. Further, the two functions of selecting the operation mode and setting the threshold can be realized by the single operation member, so that the device structure does not become complicated.

According to one aspect of the present invention, the anvil and the pin-gripping part may form a nose assembly corresponding to the type of the fastener. The housing may be configured such that selected one of a nose assembly for the breakage type fastener and a nose assembly for the non-breakage type fastener is removably mounted to the housing. According to the present aspect, a user can select an appropriate type of the nose assembly according to the type of the fastener to be used and mount/dismount it to/from the housing. The assembly herein may include not only a single assembly into which a plurality of parts are assembled, but also a plurality of separate parts which are defined as a set to be used for a specific application.

According to one aspect of the present invention, the fastening tool may further include a type detecting part which is configured to detect the type of the nose assembly mounted to the housing. The control part may be configured to control operation of the driving mechanism according to the operation mode corresponding to the type of the nose assembly which is detected by the type detecting part. According to the present aspect, the control part can automatically switch the operation mode according to the type of the mounted nose assembly, which can save labor of operation and can avoid fastening failure caused by a user's erroneous operation, compared with a case in which the operation member is operated by a user. The system for detecting the type of the nose assembly is not particularly limited. For example, any one of a contact switch which is pressed by a projection formed on the nose assembly corresponding to the type of the nose assembly, a non-contact reader which reads identification information stored in an electronic tag attached to the nose assembly, etc. may be adopted.

According to one aspect of the present invention, the control part may be configured to apply a specified pulling force, which is larger than a force required to swage the collar to the groove and large enough to break the shaft part at the small diameter par, to the pin-gripping part via the driving mechanism, when the first mode is selected, and thereafter complete the fastening process by terminating movement of the pin-gripping part in the first direction relative to the anvil. According to the present aspect, the control part can complete the fastening process in the first mode at appropriate timing by setting the specified pulling force.

According to one aspect of the present invention, the control part may be configured to move, via the driving mechanism, the pin-gripping part relative to the anvil in the first direction to a specified position in which a pulling force larger than the specified pulling force can be applied to the pin-gripping part. According to the present aspect, the control part can complete the fastening process in the first mode at appropriate timing by setting the specified position.

According to one aspect of the present invention, the driving state of the motor may be a driving current value of the motor. According to the present aspect, close output management can be performed by effectively utilizing the fact that the driving current of the motor increases as swaging of the collar to the shaft part nears completion.

According to one aspect of the present invention, the control part may be configured to complete the fastening process by terminating the movement of the pin-gripping part in the first direction relative to the anvil when the second mode is selected and the driving current exceeds a specified threshold. According to the present aspect, the control part can complete the fastening process in the second mode at appropriate timing by setting the specified threshold for the driving current of the motor.

DESCRIPTION OF EMBODIMENT

An embodiment is now described with reference to the drawings. In the following embodiment, as an example, a fastening tool 1 is described which is capable of fastening a workpiece W by using two types of fasteners 8 and 9.

First, fasteners 8 and 9, which can be used for the fastening tool 1, are described with reference to FIGS. 1 and 2. The fasteners 8 and 9 are each known as a fastener which is also referred to as a multi-piece swage type fastener. The fasteners 8 and 9 respectively include pins 80 and 90 and collars 85 and 95 which are separately formed from each other. The fasteners 8 and 9 are now described in detail.

Figure 1:
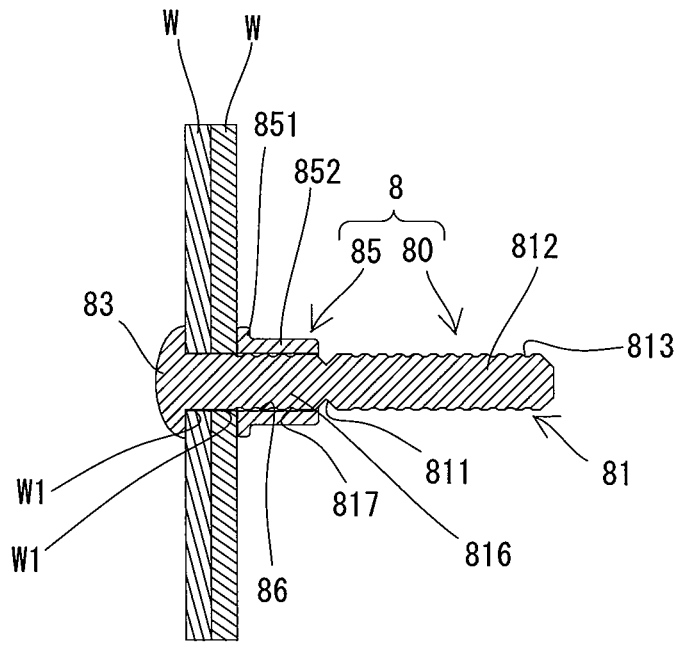
FIG. 1 is a sectional view for illustrating an example of a breakage type fastener.

The fastener 8 shown in FIG. 1 is a multi-piece swage type fastener which is referred to as a so-called breakage type fastener and mainly includes the pin 80 and the collar 85.

The pin 80 includes a shaft part 81 and a head 83 which is integrally formed on one end of the shaft part 81. The head 83 has a flat circular shape having a larger diameter than the shaft part 81. The shaft part 81 has a rod-like shape having a substantially uniform diameter over the whole length, but a generally central portion in an axial direction of the shaft part 81 has a smaller diameter than the other portions of the shaft part 81. This portion is referred to as a small-diameter part 811 for breakage. The small-diameter part 811 has a relatively lower strength than the other portions of the shaft part 81 and is configured to be the first to break when the pin 80 is pulled in the axial direction. More specifically, the small-diameter part 811 is configured to have such strength that it is to be broken when an axial force, i.e. a pulling force, which is larger than a force required to swage the collar 85 reaches a specified force.

A region of the shaft part 81 on the side opposite to the head 83 across the small-diameter part 811 is a portion which is referred to as a pintail 812 which is to be separated from the pin 80. In the present embodiment, annular pulling grooves 813 are formed on an outer peripheral surface of the pintail 812 such that a pin-gripping part 65, which will be described later, can reliably grip and pull the pin 80. In the present embodiment, the pulling grooves 813 are formed generally over the whole region of the pintail 812.

A region of the shaft part 81 which extends between the small-diameter part 811 and the head 83 is a portion which is referred to as a base part 816. Swaging grooves 817 are formed on an outer peripheral surface of the base part 816. The swaging groove 817 is configured such that the collar 85 deformed in a fastening process can be closely engaged into the swaging groove 817. In the present embodiment, the swaging grooves 817 each have an annular shape and are provided over most of the region of the base part 816 on the side of the small-diameter part 811. The smallest diameters of the portions of the shaft part 81 having the pulling grooves 813 and the swaging grooves 817 are larger than the diameter of the small-diameter part 811 such that the shaft part 81 is to be broken at the small-diameter part 811 when a specified pulling force is applied, as described above.

The collar 85 has a circular cylindrical shape having a hollow part 86 (through hole). A flange 851 is formed on one end of an outer periphery of the collar 85. The flange 851 is to be held in abutment with the workpiece W in a fastening process. An outer periphery of the collar 85 excluding the flange 851 forms an engagement part 852. The engagement part 852 is to be engaged with a tapered part 622 (see FIG. 5) of an anvil 61, which will be described later, in the fastening operation. The engagement part 852 is a region of the collar 85 to be swaged, which is to be deformed by a swaging force applied by the anvil 61. The inner diameter of the collar 85 is set to be slightly larger than the diameter of the base part 816 of the pin 80. The collar 85 may be engaged with the pin 80 when the shaft part 81 of the pin 80 is inserted through the hollow part 86. In the present embodiment, an inner peripheral surface of the collar 85 which defines the hollow part 86 is configured as a smooth surface.

Figure 2:
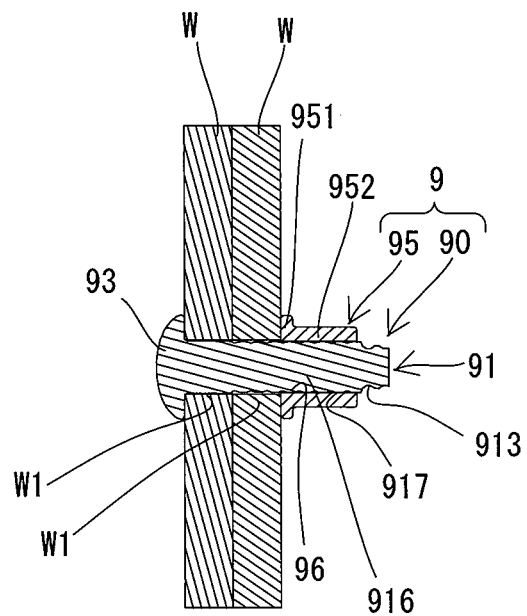
FIG. 2 is a sectional view for illustrating an example of a non-breakage type fastener.

The fastener 9 shown in FIG. 2 is a multi-piece swage type fastener which is referred to as a so-called non-breakage type fastener, and mainly includes the pin 90 and the collar 95.

The pin 90 includes a shaft part 91 and a head 93 which is integrally formed on one end of the shaft part 91. The head 93 has a flat circular shape having a larger diameter than the shaft part 91. An annular pulling groove 913 is formed on an outer peripheral surface of an end region of the shaft part 91 on the side opposite to the head 93. Annular swaging grooves 917 are formed on most of a region of a base part 916 of the shaft part 91 which extends between the pulling groove 913 and the head 93. A region of the shaft part 91 on the side opposite to the head 93 across the pulling groove 913 is formed to be shorter than the pintail 812 (see FIG. 1) of the fastener 8 and to have a smaller diameter than the base part 916.

Like the collar 85 of the fastener 8, the collar 95 has a circular cylindrical shape having a hollow part 96 (through hole), and includes a flange 951 and an engagement part 952. Further, the collar 95 has an inner diameter slightly larger than the diameter of the pin 90.

As shown in FIGS. 1 and 2, in operations of fastening two workpieces W by using the fastener 8 or 9, a user first inserts the shaft part 81 or 91 of the pin 80 or 90 into mounting holes W1 formed in the workpieces W such that the head 83 or 93 is held in abutment with one of the workpieces W.

Thereafter, the user loosely engages the collar 85 or 95 with the shaft part 81 or 91 from the other workpiece W side. At this time, the collar 85 or 95 is not yet in close contact with the swaging grooves 817 or 917 of the shaft part 81 or 91. In the following description, such a state is referred to as a temporarily fixed state. In this state in which the collar 85 or 95 is temporarily fixed to the shaft part 81 or 91, the user swages the collar 85 or 95 to the shaft part 81 or 91 and fastens the workpieces W by using the fastening tool 1.

In the fastening tool 1, apart from the fastener 8 shown as an example in FIG. 1, a plural kinds of breakage type fasteners can also be used which are different, for example, in the axial lengths and diameters of the pin 80 (the pintail 812) and the collar 85 or in the positions and shapes of the pulling grooves 813 and the swaging grooves 817. Similarly, in the fastening tool 1, apart from the fastener 9 shown as an example in FIG. 2, a plural kinds of non-breakage type fasteners can also be used which are different, for example, in the axial lengths and diameters of the pin 90 and the collar 95 or in the positions and shapes of the pulling groove 913 and the swaging groove 917.

Figure 3:
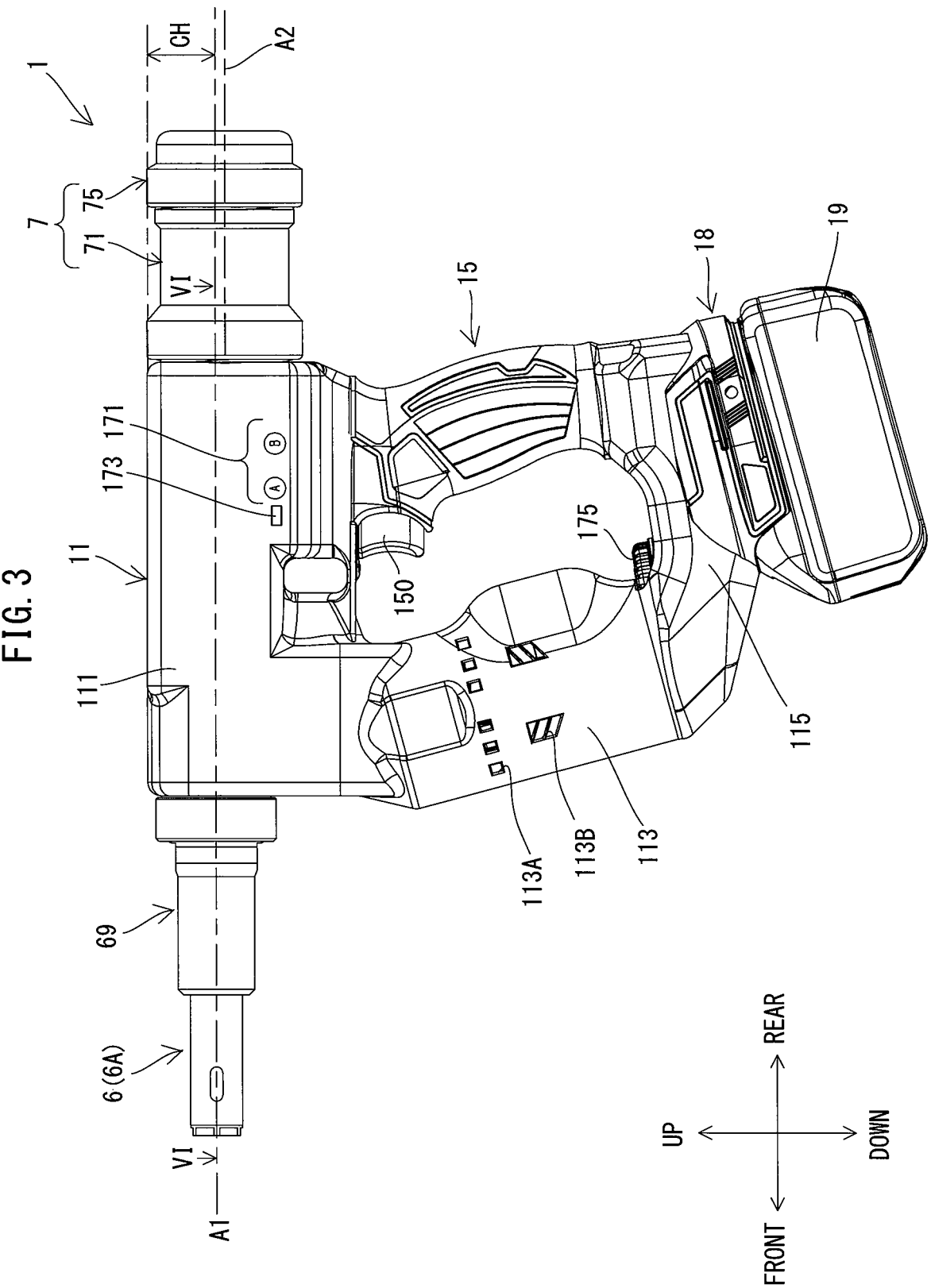
FIG. 3 is a left side view of a fastening tool.

The physical configuration of the fastening tool 1 is now described. First, the external appearance structure of the fastening tool 1 is briefly described with reference to FIG. 3. As shown in FIG. 3, an outer shell of the fastening tool 1 is mainly formed by an outer housing 11, a handle part 15 and a nose assembly 6 which is held by a nose-holding part 69.

The outer housing 11 includes a driving-mechanism housing part 111, a motor housing part 113 and a controller housing part 115. The driving-mechanism housing part 111 extends in a specified axis A1 direction. The motor housing part 113 extends from one end portion of the driving-mechanism housing part 111 in the axis A1 direction and extends in a direction which crosses the axis A1. The controller housing part 115 extends from a protruding end portion of the motor housing part 113 so as to generally face the driving-mechanism housing part 111. The handle part 15 protrudes from the other end portion of the driving-mechanism housing part 111 so as to face the motor housing part 113 and is connected to the controller housing part 115. The outer housing 11 (the driving-mechanism housing part 111, the motor housing part 113 and the controller housing part 115) and the handle part 15 form an annular shape as a whole.

In the following description, as for the directions of the fastening tool 1, for convenience of explanation, the axis A1 direction is defined as a front-rear direction of the fastening tool 1, the side on which the motor housing part 113 is disposed is defined as a front side and the side on which the handle part 15 is disposed is defined as a rear side. Further, a direction which is orthogonal to the axis A1 and corresponds to the protruding direction of the handle part 15 from the driving-mechanism housing part 111 is defined as an up-down direction, the side on which the driving-mechanism housing part 111 is disposed is defined as an upper side and the side on which the controller housing part 115 is disposed is defined as a lower side.

The nose assembly 6 is held on the front side of the driving-mechanism housing part 111 via the nose-holding part 69. In the present embodiment, the fastening tool 1 is configured as a so-called common type device which can use both of the breakage type fastener 8 and the non-breakage type fastener 9. For this purpose, the nose assembly 6 is configured to be removably mounted to the outer housing 11, and two types of nose assemblies 6A (see FIG. 5) and 6B (see FIG. 7) are available, corresponding to the fasteners 8 and 9, respectively. In use, the user may attach to the fastening tool 1 the nose assembly 6A or 6B which corresponds to the fastener 8 or 9 to be actually used. It is noted that the term "nose assembly 6" is used when referring to the nose assemblies 6A and 6B collectively or without any distinction.

The common type fastening tool 1 needs to control operation according to the type of the fastener 8 or 9 to be actually used. Therefore, the fastening tool 1 has two kinds of operation modes, that is, a first mode for the breakage type fastener 8 and a second mode for the non-breakage type fastener 9. A push-type mode selection switch 171 with which the user can select the operation mode is provided on a left side of the driving-mechanism housing part 111. The mode selection switch 171 includes a button A corresponding to the first mode and a button B corresponding to the second mode and outputs a signal corresponding to the pushed button. An LED lamp 173 for warning relating to mounting of a collection container 7, which will be described later, is provided adjacent to the mode selection switch 171 on the left side of the driving-mechanism housing part 111.

The collection container 7, which is configured to store the pintail 812 (see FIG. 1) separated in a fastening process, is removably mounted to a rear end portion of the driving-mechanism housing part 111. As described above, only when the breakage type fastener 8 is used, the pintail 812 is separated. Therefore, the user may mount/dismount the collection container 7 to/from the fastening tool 1 as necessary.

The motor housing part 113 has inlets 113B through which cooling air for cooling the motor 20 (see FIG. 4) flows in, and outlets 113A through which cooling air is discharged to the outside. The inlets 113B and the outlets 113A are arranged to face the motor 20 and a fan 23 (see FIG. 4), which will be described later, respectively.

A battery mounting part 18 is provided on a lower end of the controller housing part 115. The battery mounting part 18 is configured such that a battery 19 is removably mounted thereto. The battery 19 is a rechargeable power source for supplying electric power to each part of the fastening tool 1 and the motor 20. Further, a rotary setting dial 175 is provided on an upper end of the controller housing part 115. Although described in detail later, the setting dial 175 may be used to set a threshold of driving current which is to be used to determine completion of the fastening process when the non-breakage type fastener 9 is used. Further, a trigger 150, which is configured to be depressed by the user, is provided on the front side of an upper end portion of the handle part 15.

The internal configuration of the fastening tool 1 is now described in detail with reference to FIGS. 4 to 7.

Figure 4:
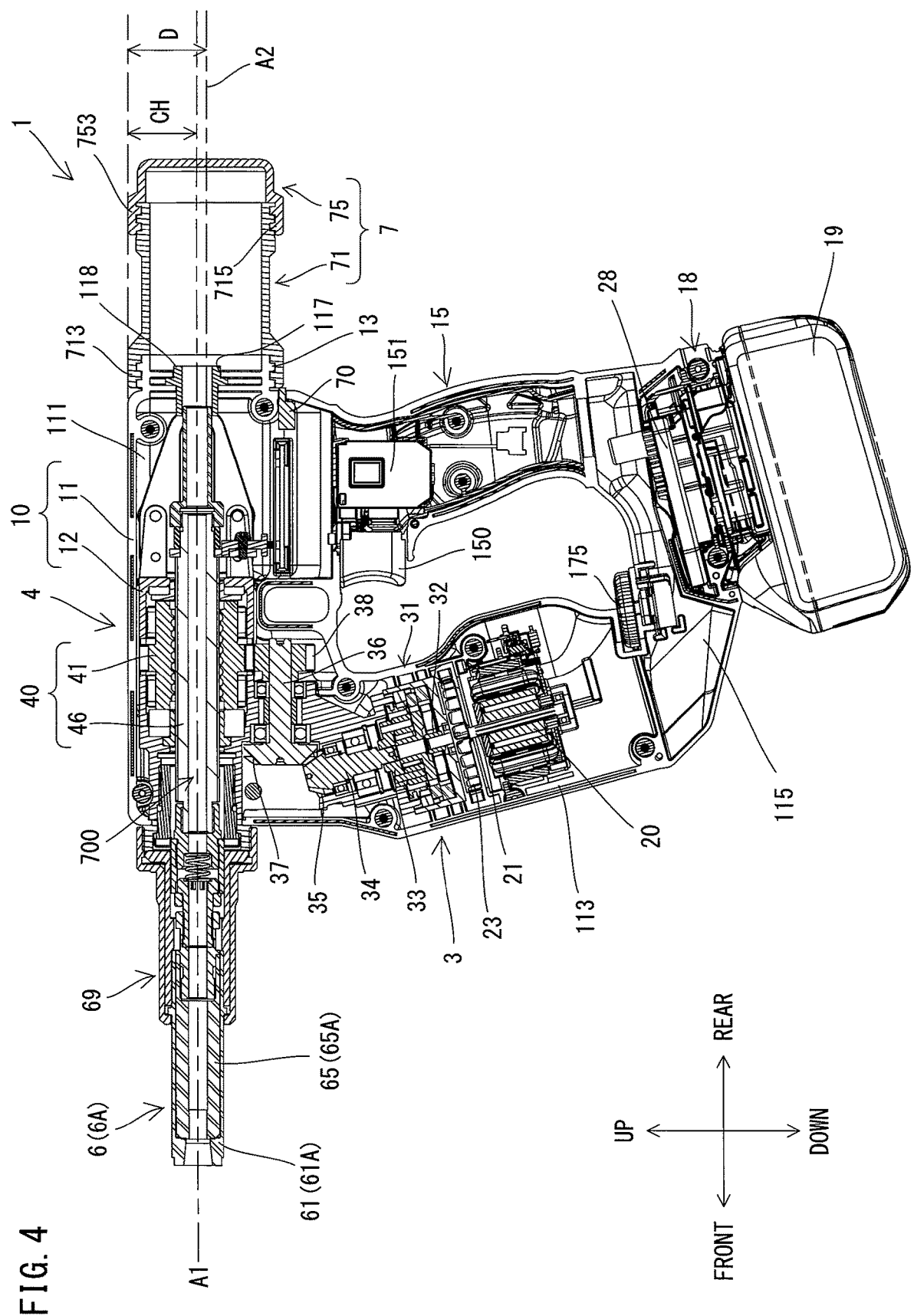
FIG. 4 is a sectional view of a fastening tool.

As shown in FIG. 4, a switch 151 is housed in the handle part 15. The switch 151 is configured to be switched on and off in response to a depressing operation of the trigger 150 by the user. Further, the outer housing 11 mainly houses the controller 28, the motor 20, a transmitting mechanism 3 and the driving mechanism 4 which includes a ball-screw mechanism 40. The transmitting mechanism 3 and a portion of the driving mechanism 4 are housed in an inner housing 12. The inner housing 12 is fixedly held by the outer housing 11. In this sense, the outer housing 11 and the inner housing 12 can be considered as one piece in the form of a housing 10.

In the present embodiment, the inner housing 12 is disposed to occupy a front portion of the driving-mechanism housing part 111 and an upper portion of the motor housing part 113 of the outer housing 11. The outer housing 11 is formed of resin. Only a lower end portion of the inner housing 12 which houses a planetary gear mechanism 31, which will be described later, is formed of resin and the other portion of the inner housing 12 is formed of metal. The lower end portion and the other portion of the inner housing 12 are connected and fixed to each other by screws (not shown).

The controller 28 is now described. As shown in FIG. 4, the controller 28 is housed in the controller housing part 115 of the outer housing 11. In the present embodiment, a control circuit composed of a microcomputer including a CPU, a ROM and a RAM is employed as the controller 28. The controller 28 is connected to the switch 151 etc. via wiring (not shown).

The motor 20 is now described. As shown in FIG. 4, the motor 20 is housed in a lower portion of the motor housing part 113. In the present embodiment, a compact and high-output brushless DC motor is employed as the motor 20. The motor 20 is disposed such that a rotation axis of a motor shaft 21 extends obliquely in the up-down direction to cross the axis A1. The fan 23 for cooling the motor 20 is fixed to a portion of the motor shaft 21 which protrudes upward from the motor 20. When the motor 20 is driven, the fan 23 generates a cooling air flow which is led into the motor housing part 113 through the inlets 113B (see FIG. 3) to flow around the motor 20 and is discharged to the outside from the outlets 113A (see FIG. 3).

The transmitting mechanism 3 is now described. As shown in FIG. 4, the transmitting mechanism 3 is disposed above the motor 20 and the fan 23 within the inner housing 12 so as to extend over the upper portion of the motor housing part 113 and the lower portion of the driving-mechanism housing part 111. The transmitting mechanism 3 is configured to transmit rotation of the motor shaft 21 to a nut 41 of the ball-screw mechanism 40. In the present embodiment, the transmitting mechanism 3 is configured as a speed reducing mechanism and includes a two-stage planetary gear mechanisms 31 and an intermediate shaft 36 having a bevel gear 37 and a nut driving gear 38.

A sun gear 32 of the first stage planetary gear mechanism of the planetary gear mechanisms 31 is fixed to an upper end portion of the motor shaft 21. An output shaft 34 connected to a carrier 33 of the second stage planetary gear mechanism of the planetary gear mechanisms 31 has a bevel gear 35 on its upper end portion. The bevel gear 37 formed on a front end portion of the intermediate shaft 36 is engaged with the bevel gear 35. The intermediate shaft 36 is disposed to extend in the axis A1 direction (the front-rear direction). The planetary gear mechanisms 31 reduce the rotation speed of the motor shaft 21 and transmits it to the intermediate shaft 36. The nut driving gear 38 is formed on a rear end portion of the intermediate shaft 36 and is engaged with a driven gear 411 (see FIG. 5) formed on an outer periphery of the nut 41.

Figure 5:
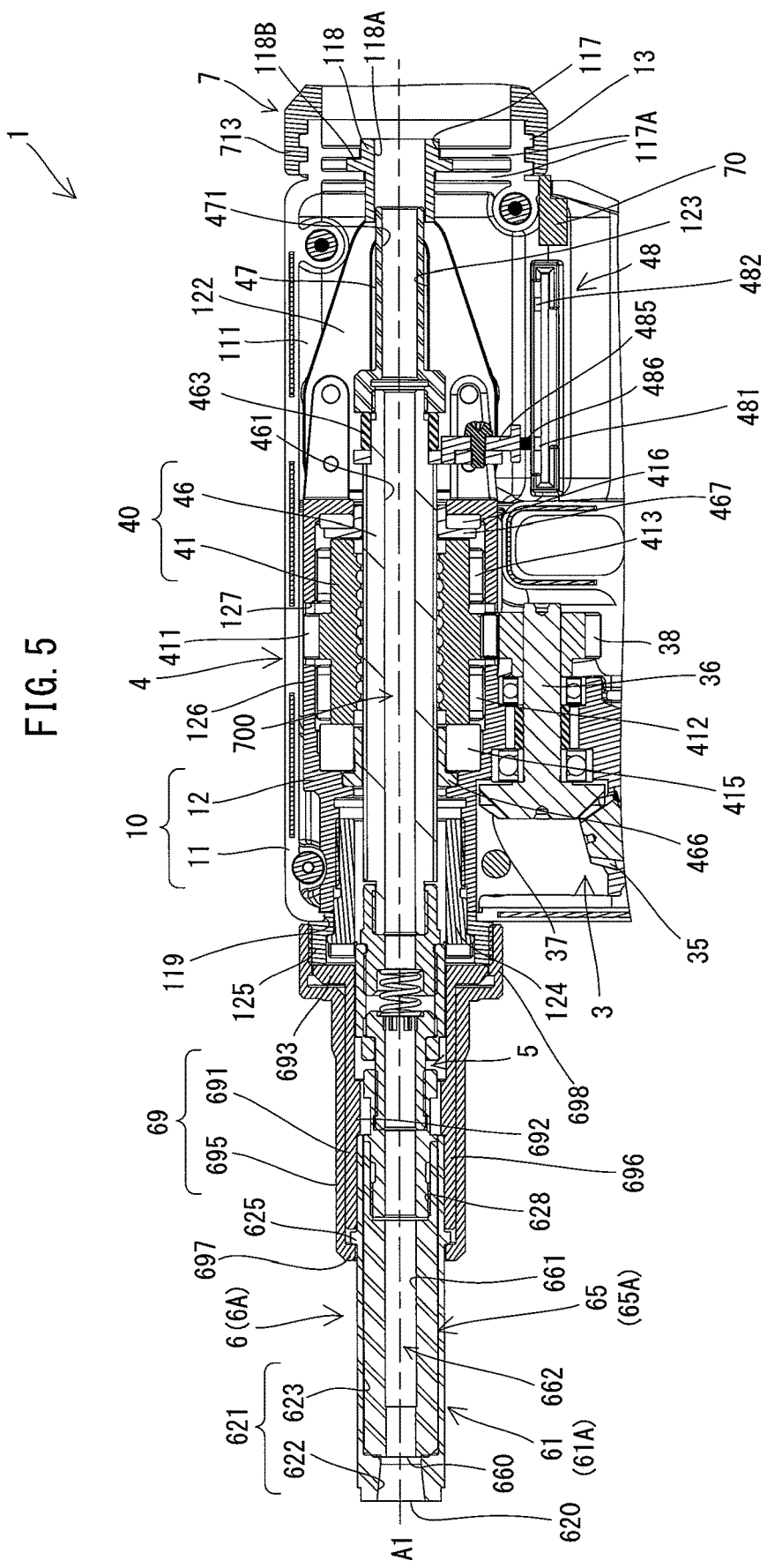
FIG. 5 is a partial, enlarged view of an upper portion of the fastening tool shown in FIG. 4, showing the fastening tool to which a nose assembly for the breakage type fastener is mounted.

The driving mechanism 4 is now described with reference to FIGS. 5 and 6. As shown in FIG. 5, the driving mechanism 4 mainly includes the ball-screw mechanism 40 and a connection mechanism 5.

First, the structures of the ball-screw mechanism 40 and its periphery are described. The ball-screw mechanism 40 mainly includes the nut 41 and a screw shaft 46. In the present embodiment, the ball-screw mechanism 40 is configured to convert rotation of the nut 41 into linear motion of the screw shaft 46 and to linearly move the pin-gripping part 65 which is connected to the screw shaft 46 via the connection mechanism 5.

The nut 41 is supported by the inner housing 12 so as to be rotatable around the axis A1 and while its movement in the axis A1 direction is restricted. Specifically, as shown in FIG. 5, the nut 41 has a circular cylindrically shape and has the driven gear 411 integrally provided on its outer periphery. The nut 41 is supported, via a pair of radial rolling bearings 412 and 413 which are respectively fitted onto the nut 41 on the front and rear sides of the driven gear 411, so as to be rotatable around the axis A1 relative to the inner housing 12. In the present embodiment, a needle bearing is employed for each of the radial rolling bearings 412 and 413. The driven gear 411 is engaged with the above-described nut driving gear 38. When the driven gear 411 receives the rotating output of the motor 20 from the nut driving gear 38, the nut 41 is rotated around the axis A1.

Further, although described in detail later, in the fastening process, a strong axial force is applied to the nut 41 in the axis A1 direction (the front-rear direction). Therefore, a thrust rolling bearing 415 is disposed between a front end of the nut 41 and the inner housing 12, and a thrust rolling bearing 416 is disposed between a rear end of the nut 41 and the inner housing 12 via a thrust washer 467. In the present embodiment, a ball bearing is employed for the front thrust rolling bearing 415 and a needle bearing is employed for the rear thrust rolling bearing 416.

When an axial force (thrust load) in the axis A1 direction (frontward or rearward direction) is applied to the nut 41, either one of the thrust rolling bearings 415 and 416 allows the nut 41 to smoothly rotate around the axis A1 while reliably receiving the axial force, thereby avoiding the risk that the strong axial force may impede rotation of the nut 41. The thrust rolling bearings 415 and 416 are respectively configured to have a diameter larger than the outer diameter of the nut 41 at front and rear end portions of the nut 41. In this manner, the axial force (thrust load) applied to the nut 41 per unit area can be avoided from being increased, so that the operating performance and durability can be improved.

The screw shaft 46 is held to be movable along the axis A1 while its rotation around the axis A1 is restricted. Specifically, as shown in FIGS. 5 and 6, the screw shaft 46 is formed as an elongate member, and extends along the axis A1 and inserted through the nut 41. Although not shown in detail as being a well-known structure, a number of balls are rollably disposed within a spiral track which is defined by a spiral groove formed in an inner peripheral surface of the nut 41 and a spiral groove formed in an outer peripheral surface of the screw shaft 46. The screw shaft 46 is engaged with the nut 41 via these balls. Sleeve portions of thrust washers 466 and 467 are disposed between the screw shaft 46 and the thrust rolling bearings 415 and 416 which are disposed on the front and rear sides of the nut 41, respectively.

Figure 6:
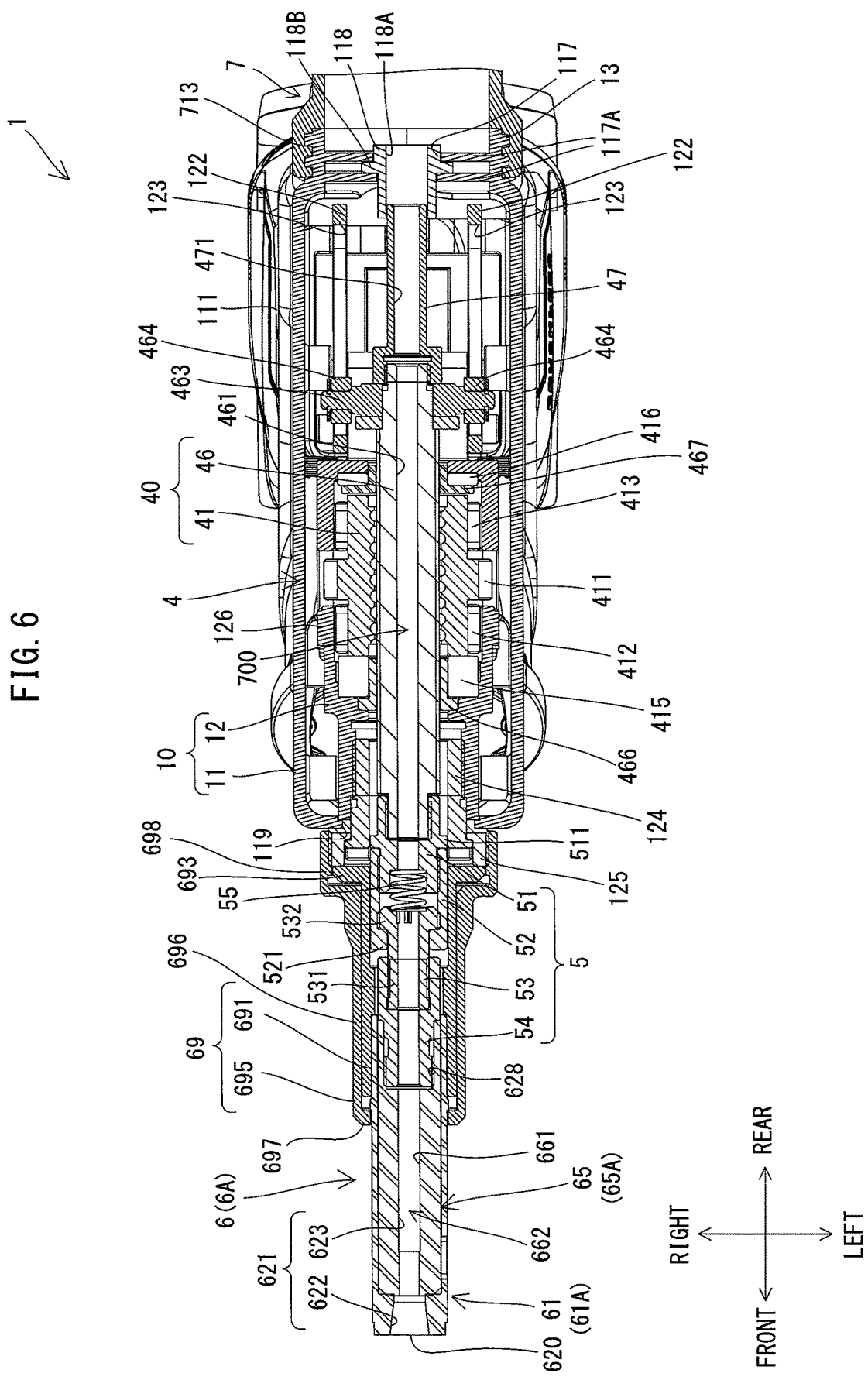
FIG. 6 is a sectional view taken along line VI-VI in FIG. 3.

As shown in FIG. 6, a central portion of a roller shaft 463 is fixed to a rear end portion of the screw shaft 46. The roller shaft 463 extends orthogonally to the screw shaft 46 and protrudes rightward and leftward from the screw shaft 46. Rollers 464 are rotatably held on right and left end portions of the roller shaft 463, respectively. As shown in FIGS. 5 and 6, a pair of right and left guide plates 122 are connected and fixed to a rear end portion of the inner housing 12. The guide plates 122 are arranged to face each other in the right-left direction and each have a slot-like guide hole 123 extending in the axis A1 direction (the front-rear direction). The right and left rollers 464 are held to be rollable along the right and left guide holes 123 in the axis A1 direction.

In the present embodiment, the rollers 464 are provided on the screw shaft 46 side and the guide holes 123 are provided on the inner housing 12 (the guide plates 122) side, but, vice versa, the guide holes 123 may be provided on the screw shaft 46 side and the rollers 464 may be provided on the inner housing 12 side. The guide holes 123 may be replaced with other structures such as guide rails as long as abutment with the rollers 464 is secured.

In the ball-screw mechanism 40 having the above-described structure, when the nut 41 is rotated around the axis A1, the screw shaft 46 engaged with the nut 41 via the rolling balls linearly moves in the axis A1 direction relative to the nut 41 and the housing 10. The screw shaft 46 may be subjected to rotation torque around the axis A1 when the nut 41 is rotated. By abutment between the rollers 464 and the guide holes 123, however, rotation of the screw shaft 46 around the axis A1 due to such rotation torque is restricted.

As shown in FIGS. 5 and 6, the inner housing 12 includes a nut housing part 126 which has a generally rectangular box-like shape and houses the nut 41. The diameter of the driven gear 411 is set such that the outer periphery of the driven gear 411 is substantially flush with an upper surface of the inner housing 12 through an opening 127 formed in an upper surface of the nut housing part 126. In other words, the driven gear 411 and the inner housing 12 are configured such that the outer periphery of the driven gear 411 does not protrude outward from the upper surface of the inner housing 12. This structure may contribute to reduction of a so-called center height (a distance from the axis A1 to the upper surface of the outer housing 11) CH (see FIG. 4) of the fastening tool 1.

Moreover, an extension shaft 47 is connected and fixed to a rear end (specifically, the rear side of the roller shaft 463) of the screw shaft 46. Therefore, when the screw shaft 46 moves along the axis A1 in the front-rear direction, the extension shaft 47 moves together with the screw shaft 46 in the front-rear direction. Further, the screw shaft 46 and the extension shaft 47 respectively have through holes 461 and 471 having substantially the same diameter and extending in the axial direction. The screw shaft 46 and the extension shaft 47 are coaxially connected to each other such that the through holes 461 and 471 communicate with each other. The diameters of the through holes 461 and 471 are each set to be slightly larger than the largest possible diameter of a pintail of a breakage type fastener which can be used for the fastening tool 1.

An opening 117 is formed on the axis A1 in a rear end portion of the outer housing 11. The opening 117 provides communication between the inside and the outside of the outer housing 11. A circular cylindrical guide tube 118 is fitted into the opening 117. The guide tube 118 is configured to guide sliding movement of the extension shaft 47 along the axis A1. Therefore, the diameter of a through hole 118A of the guide tube 118 (the inner diameter of the guide tube 118) is set to be substantially equal to the outer diameter of the extension shaft 47. A flange 118B is provided on an outer periphery of the guide tube 118. Two annular ribs 117A are formed around the opening 117 on the rear end portion of the outer housing 11.

In the present embodiment, right halves and left halves of the outer housing 11 and the handle part 15 are integrally molded of resin with each other, respectively. Further, the right and left halves are connected to each other by screws (not shown) after internal components are housed therein. Before assembling the outer housing 11 and the handle part 15, the flange 118B is disposed between the two ribs 117A of the right half or left half of the outer housing 11. Thereafter, the right half and the left half are connected to each other, so that the guide tube 118 is fixed by the ribs 117A.

A rear end of the extension shaft 47 is located within a front end portion of the guide tube 118 when the screw shaft 46 is placed in a foremost position within its movable range (a position shown in FIGS. 5 and 6). When the screw shaft 46 is moved rearward from the foremost position along with rotation of the nut 41, the extension shaft 47 moves rearward while sliding within the through hole 118A of the guide tube 118. By arranging the guide tube 118 as described above, the pintail 812 can be prevented from entering the outer housing 11 when the extension shaft 47 is placed in the foremost position, while maintaining the whole length of the extension shaft 47 relatively short.

Further, as shown in FIGS. 5 and 6, a container connection part 13 is provided on the rear end portion of the outer housing 11. The container connection part 13 has a circular cylindrical shape and protrudes rearward. The container connection part 13 is configured such that the collection container 7 for the pintail 812 is removably mounted thereto. The structure of connecting the collection container 7 to the container connection part 13 will be described in detail later.

As shown in FIG. 5, adjacent to the front side of the roller shaft 463, a magnet holding arm 485 is fixed to the screw shaft 46, and extends downward from the screw shaft 46. A magnet 486 is mounted on a lower end of the magnet holding arm 485. The magnet 486 is fixed to be integral with the screw shaft 46, so that the magnet 486 moves along with movement of the screw shaft 46 in the axis A1 direction (the front-rear direction).

A position detecting mechanism 48 is provided in the outer housing 11. The position detecting mechanism 48 is configured to detect, via the magnet 486, the position of the screw shaft 46 in the axis A1 direction relative to the housing 10. The position detecting mechanism 48 includes an initial-position sensor 481 and a rearmost-position sensor 482. The initial-position sensor 481 and the rearmost-position sensor 482 are both electrically connected to the controller 28 (see FIG. 4) via wiring (not shown). Each of the initial-position sensor 481 and the rearmost-position sensor 482 is configured to output a specified signal to the controller 28 when the magnet 486 is located within its specified detection range. The initial-position sensor 481 is mounted in a position where the initial-position sensor 481 is capable of detecting the magnet 486 when the screw shaft 46 is located in the foremost position (also referred to as an initial position) within the movable range. The rearmost-position sensor 482 is mounted in a position where the initial-position sensor 481 is capable of detecting the magnet 486 when the screw shaft 46 is placed in the rearmost position within the movable range. In the present embodiment, the operation of the driving mechanism 4 is controlled according to the detection results of the position detecting mechanism 48, which will be described in detail later.

The connection mechanism 5 is now described. The connection mechanism 5 connects the screw shaft 46 and the pin-gripping part 65 in the axis A1 direction. As shown in FIG. 6, in the present embodiment, the connection mechanism 5 includes a first connection part 51, a second connection part 52, a third connection part 53 and a fourth connection part 54 which are connected in the axis A1 direction in this order from the screw shaft 46 side (rear end side). The first connection part 51 and the second connection part 52 are threadedly connected and fixed to each other, and the third connection part 53 and the fourth connection part 54 are also threadedly connected and fixed to each other. Further, a rear end portion of the third connection part 53 is slidably disposed in the inside of the circular cylindrical second connection part 52, so that the second connection part 52 and the third connection part 53 are connected to be movable in the axis A1 direction relative to each other.

The connection manner of the connection mechanism 5 is now described in detail with reference to FIG. 6. First, a recess having a female thread is provided in a rear portion of the first connection part 51. A small-diameter portion having a male thread is provided on a front end portion of the screw shaft 46. When the small-diameter portion is threadedly inserted into the recess of the first connection part 51, the first connection part 51 is connected and fixed to the front side of the screw shaft 46. The first connection part 51 is formed to have substantially the same diameter as the screw shaft 46. A male thread is formed on an outer peripheral surface of a front portion of the first connection part 51. Further, guide ribs 511 are provided on the rear side of and adjacent to the male thread region of the first connection part 51. The guide ribs 511 respectively protrude rightward and leftward. The guide ribs 511 are provided as rear stoppers which abut on a front end surface of the thrust washer 466 when the screw shaft 46 is moved to the rearmost position.

The second connection part 52 has a bottomed circular cylindrical shape having an inner diameter substantially equal to the outer diameter of the first connection part 51. The second connection part 52 is arranged such that its bottom wall is orthogonal to the axis A1 on the front side. A female thread is formed on an inner peripheral surface of a rear portion of the second connection part 52. The third connection part 53 has a circular cylindrical shape and includes a body 531 and a locking flange 532 integrally formed on a rear end of the body 531. A front wall (bottom wall) 521 of the second connection part 52 has a through hole having substantially the same diameter as the body 531 of the third connection part 53.

The locking flange 532 of the third connection part 53 is disposed in the inside of the second connection part 52 and the body 531 is inserted forward through the through hole of the front wall 521 of the second connection part 52. Further, a coil spring 55 is disposed between a recess provided in the front end portion of the first connection part 51 and the locking flange 532 of the third connection part 53, and in this state, the male thread portion of the first connection part 51 is threadedly inserted into the rear portion of the second connection part 52. When the screw shaft 46 is placed in the initial position, the locking flange 532 is biased toward the front wall 521 by biasing force of the coil spring 55. With such a structure, the third connection part 53 can be moved in the axis A1 direction relative to the second connection part 52 and the first connection part 51.

A male thread is formed on the outer periphery of the front portion of the third connection part 53, while a recess having a female thread is provided in a rear portion of the fourth connection part 54. When the front portion of the third connection part 53 is threadedly inserted into the recess of the fourth connection part 54, the third connection part 53 and the fourth connection part 54 are connected and fixed to each other. Further, a front portoin of the fourth connection part 54 is configured as a small-diameter portion having a smaller diameter than the rear portion of the fourth connection part 54, and a male thread is formed on its outer peripheral surface and can be threadedly engaged with the pin-gripping part 65.

Each of the first connection part 51, the third connection part 53 and the fourth connection part 54 has a through hole having a diameter substantially equal to the diameter of the through hole 461 of the screw shaft 46 and extending in the axis A1 direction. Therefore, the connection mechanism 5 as a whole has a passage which extends through the first connection part 51, the second connection part 52 (specifically, the inside of the coil spring 55), the third connection part 53 and the fourth connection part 54. Further, by combination of this passage with the through hole 461 of the screw shaft 46, the through hole 471 of the extension shaft 47 and the through hole 118A of the guide tube 118 which are described above, a passage is formed which extends along the axis A1 to the opening 117 provided in the rear end portion of the outer housing 11 through the connection mechanism 5, the screw shaft 46, the extension shaft 47 and the guide tube 118. This passage forms a collection passage 700. The pintail 812, which has been separated from the pin 80 in a fastening process using the breakage type fastener 8, can pass through the collection passage 700.

As shown in FIGS. 5 and 6, the inner housing 12 has an upper front end portion which has a circular cylindrical shape. A circular cylindrical guide sleeve 124 is threadedly engaged with the inside of this upper front end portion, and disposed coaxially with the screw shaft 46. The guide sleeve 124 has an inner diameter substantially equal to the diameter of a portion of the first connection part 51 in which the guide rib 511 is formed and to the outer diameter of the second connection part 52, and is configured to guide the first connection part 51 and the second connection part 52 to slide in the axis A1 direction. An opening 119 is formed around the axis A1 in an upper front portion of the outer housing 11. A flange-like front end portion of the guide sleeve 124 protrudes through the opening 119 of the outer housing 11 and fixedly holds a circular cylindrical nose connection part 125 relative to the housing 10. The nose connection part 125 is coaxially arranged with the screw shaft 46 and has a male thread on its outer peripheral surface.

The nose-holding part 69 is removably connected to the nose connection part 125. The nose-holding part 69 includes an inner sleeve 691 and an outer sleeve 695.

The inner sleeve 691 has a circular cylindrical shape and is configured to hold the connection mechanism 5 and the pin-gripping part 65 so as to be slidable in the axis A1 direction. Specifically, the inner sleeve 691 has an inner diameter substantially equal to the outer diameter of the second connection part 52 and the outer diameter of the anvil 61, and has an anvil locking part 692 formed on its central portion in the axis A1 direction and protruding radially inward. The inner diameter of the portion having the anvil locking part 692 is substantially equal to the outer diameter of the pin-gripping part 65. Further, a flange 693 is provided on a rear end of the inner sleeve 691 and has a slightly smaller diameter than the outer diameter of the nose connection part 125.

The outer sleeve 695 has a circular cylindrical shape and is slightly larger than the inner sleeve 691. The outer sleeve 695 is configured to be removably mounted to the nose connection part 125. Specifically, the outer sleeve 695 includes a small-diameter part 696 having an inner diameter substantially equal to the outer diameter of the inner sleeve 691 and a large-diameter part 698 having an inner diameter substantially equal to the outer diameter of the nose connection part 125. The small-diameter part 696 is formed to be longer than a portion of the inner sleeve 691 excluding the flange 693 in the axis A1 direction and has a front end part 697 protruding radially inward. A female thread is formed on an inner peripheral surface of the large-diameter part 698 to be threadedly engaged with a male thread of the nose connection part 125.

A rear end surface of the flange 693 abuts on the nose connection part 125, and in this state, the outer sleeve 695 is fitted onto the inner sleeve 691 and the large-diameter part 698 is threadedly engaged with the nose connection part 125, so that the nose-holding part 69 is connected and fixed to the housing 10. At this time, a clearance is formed between the front end part 697 of the outer sleeve 695 and a front end of the inner sleeve 691 in which locking ribs 625 or 635, which will be described later (see FIGS. 5 and 7) of the anvil 61, are disposed.

The nose assembly 6 is now described with reference to FIGS. 5 and 7. Directions of the nose assembly 6 are described on the basis of the state of the nose assembly 6 mounted to the housing 10.

The nose assembly 6 mainly includes the anvil 61 and the pin-gripping part 65. As described above, the fastening tool 1 of the present embodiment is configured as a common type device which is capable of fastening both the breakage type fastener 8 and the non-breakage type fastener 9, and accordingly, two types of nose assemblies 6A (see FIG. 5) and 6B (see FIG. 7) which can be removably mounted to the outer housing 11 are available. Therefore, the detailed structures of the anvil 61 and the pin-gripping part 65 differ between the nose assemblies 6A and 6B. Hereinafter, the anvil 61 and the pin-gripping part 65 of the nose assembly 6A are respectively referred to as an anvil 61A and a pin-gripping part 65A, and the anvil 61 and the pin-gripping part 65 of the nose assembly 6B are respectively referred to as an anvil 61B and a pin-gripping part 65B.

The anvils 61A and 61B are respectively configured to be engaged with the collars 85 and 95 and to be removably mounted to the housing 10 via the nose-holding part 69. Further, the pin-gripping parts 65A and 65B are respectively configured to grip the shaft parts 81 and 91 of the pins 80 and 90 and held to be movable along the axis A1 relative to the anvils 61A and 61B. In this sense, it can be said that the nose assemblies 6A and 6B basically have the same structure.

First, the nose assembly 6A for the breakage type fastener 8 is described with reference to FIG. 5.

The anvil 61A is configured as a circular cylindrical member having a bore 621 extending in the axis A1 direction. The bore 621 includes a tapered part 622 and a guide part 623.

The tapered part 622 forms a front end region of the bore 621 and has a length slightly longer than the height of the engagement part 852 (see FIG. 1) of the collar 85 in the axis A1 direction (the front-rear direction). The tapered part 622 is configured to gradually increase in diameter toward an open end (front end) 620 of the bore 621. The diameter of the tapered part 622 is set to be slightly larger at the open end 620 than the outer diameter of the engagement part 852, but smaller in the other region extending rearward from the open end 620 than the outer diameter of the engagement part 852. With such a structure, only when acted upon by a strong axial force which is enough to deform the engagement part 852, the engagement part 852 enters the tapered part 622 from the open end 620 while deforming.

The guide part 623 forms a region extending rearward from the tapered part 622 in the bore 621. The guide part 623 has a diameter larger than that of a rear end of the tapered part 622 and substantially equal to the outer diameter of the pin-gripping part 65A described later and holds the pin-gripping part 65A so as to be slidable in the axis A1 direction.

The anvil 61A has locking ribs 612 protruding radially outward in a region slightly toward a rear end from a central portion of an outer periphery of the anvil 61A. The locking rib 625 is locked between the outer sleeve 695 and the inner sleeve 691, so that the anvil 61A is held via the nose-holding part 69 to be immovable in the axis A1 direction relative to the housing 10.

The pin-gripping part 65A is coaxially arranged with the anvil 61A to be slidable within the guide part 623 of the anvil 61A. Thus, the pin-gripping part 65A is held to be movable along the axis A1 relative to the anvil 61A. Further, in the present embodiment, a well-known structure which mainly includes a plurality of claws (also referred to as a jaw), which are configured to grip a portion of the pintail 812 (see FIG. 1), and a holding body, which is configured to hold the claws, is adopted as the pin-gripping part 65A. Although not shown in detail, the pin-gripping part 65A is configured such that the gripping force of the claws increases as the pin-gripping part 65A moves rearward from an initial position (a foremost position) along the axis A1. In order to realize such a structure, for example, the claws are arranged to be movable while being pressed against a conical track provided within a front end portion of the holding body. Further, in the present embodiment, a plurality of projections are formed on the inside of the claw to be engaged with the pulling grooves 813 formed in the pintail 812.

Although the claws, the holding body and other parts are shown in a simplified form in one piece in the drawings, the pin-gripping part 65A as a whole is configured as a circular cylindrical member having a bore 661 extending in the axis A1 direction. The diameter of the bore 661 is set to be slightly larger than that of the pintail 812. Although described in detail later, the bore 661 forms an internal passage 662 through which the pintail 812 may pass after inserted and separated. Further, a recess 628 having a circular section is formed in a rear end portion of the pin-gripping part 65A. A female thread is formed on an inner peripheral surface of the recess 628 to be threadedly engaged with the male thread formed on the outer peripheral surface of the small-diameter portion of the fourth connection part 54. Thus, the pin-gripping part 65A is configured to be attachable to and removable from the screw shaft 46 via the connection mechanism 5.

When the pin-gripping part 65A is connected to the fourth connection part 54, the internal passage 662 of the pin-gripping part 65A communicates with the collection passage 700 extending through the connection mechanism 5 etc. Specifically, a passage is formed to linearly extend along the axis A1 from an open end 660 of the bore 661 from which the pintail 812 is inserted, to the opening 117 of the rear end portion of the outer housing 11.

The nose assembly 6B for the non-breakage type fastener 9 is now described with reference to FIG. 7.

The anvil 61B is configured as a circular cylindrical member having a bore 631 extending in the axis A1 direction. Further, the anvil 61B has locking ribs 635 protruding radially outward in a region slightly toward a rear end from a central portion of an outer periphery of the anvil 61B. The bore 631 includes a tapered part 632, a gripping-claw guide part 633 and a base guide part 634.

The tapered part 632 has a structure which is similar to the above-described tapered part 622. Specifically, the tapered part 632 forms a front end region of the bore 631 and has a length slightly longer than the height of the engagement part 952 (see FIG. 2) of the collar 95. Further, the tapered part 632 is configured to gradually increase in diameter toward an open end (front end) 630 of the bore 631. The diameter of the tapered part 632 is set to be slightly larger at the open end 630 than the outer diameter of the engagement part 952, but smaller in the other region extending rearward from the open end 630 than the outer diameter of the engagement part 952. With such a structure, only when acted upon by a strong axial force which is enough to deform the engagement part 952, the engagement part 952 enters the tapered part 632 from the open end 630 while deforming.

The gripping-claw guide part 633 is an intermediate region contiguously extending rearward from the tapered part 632 of the bore 631 and has the same diameter as a rear end of the tapered part 632. When the screw shaft 46 is moved in the axis A1 direction (the front-rear direction), gripping claws 671 are moved in the front-rear direction within the gripping-claw guide part 633.

The base guide part 634 forms a region extending rearward from the gripping-claw guide part 633 of the bore 631. The base guide part 634 has a diameter larger than that of the gripping-claw guide part 633 and substantially equal to the outer diameter of a base 672 of the pin-gripping part 65B described below and holds the pin-gripping part 65B so as to be slidable in the axis A1 direction.

The pin-gripping part 65B is coaxially arranged with the anvil 61B to be slidable within the bore 631 of the anvil 61B. Thus, the pin-gripping part 65B is held to be movable along the axis A1 relative to the anvil 61B. Further, in the present embodiment, the pin-gripping part 65B includes a plurality of gripping claws (also referred to as a jaw) 671, which are configured to grip a portion of an end region of the shaft part 91 of the fastener 9, and the base part 672, which is integrally formed with the gripping claws 671.

In the present embodiment, a total of three gripping claws 671 are equidistantly arranged on an imaginary circumference around the axis A1. Further, the gripping claws 671 are configured such that the distance between the adjacent gripping claws 671 increases toward the front end. The length of the gripping claws 671 in the axis A1 direction is set to be longer than the total length of the tapered part 632 and the gripping-claw guide part 633 of the anvil 61B. With such a structure, a front end portion of each of the gripping claws 671 protrudes forward from the open end 630 of the bore 631 of the anvil 61B when the pin-gripping part 65B is placed in a foremost position relative to the anvil 61B. Further, the base part 672 has a bottomed circular cylindrical shape having a closed front end. A female thread is formed on an inner peripheral surface of a rear end portion of the base part 672 to be threadedly engaged with the male thread formed on the outer peripheral surface of the fourth connection part 54. Thus, the pin-gripping part 65B is configured to be attachable to and removable from the screw shaft 46 via the connection mechanism 5. With the above-described structure, the gripping force of the gripping claws 671 increases as the gripping claws 671 are retracted into the bore 631 and moved rearward.

A method of mounting/dismounting the nose assembly 6 to/from the housing 10 is now described.

Figure 7:
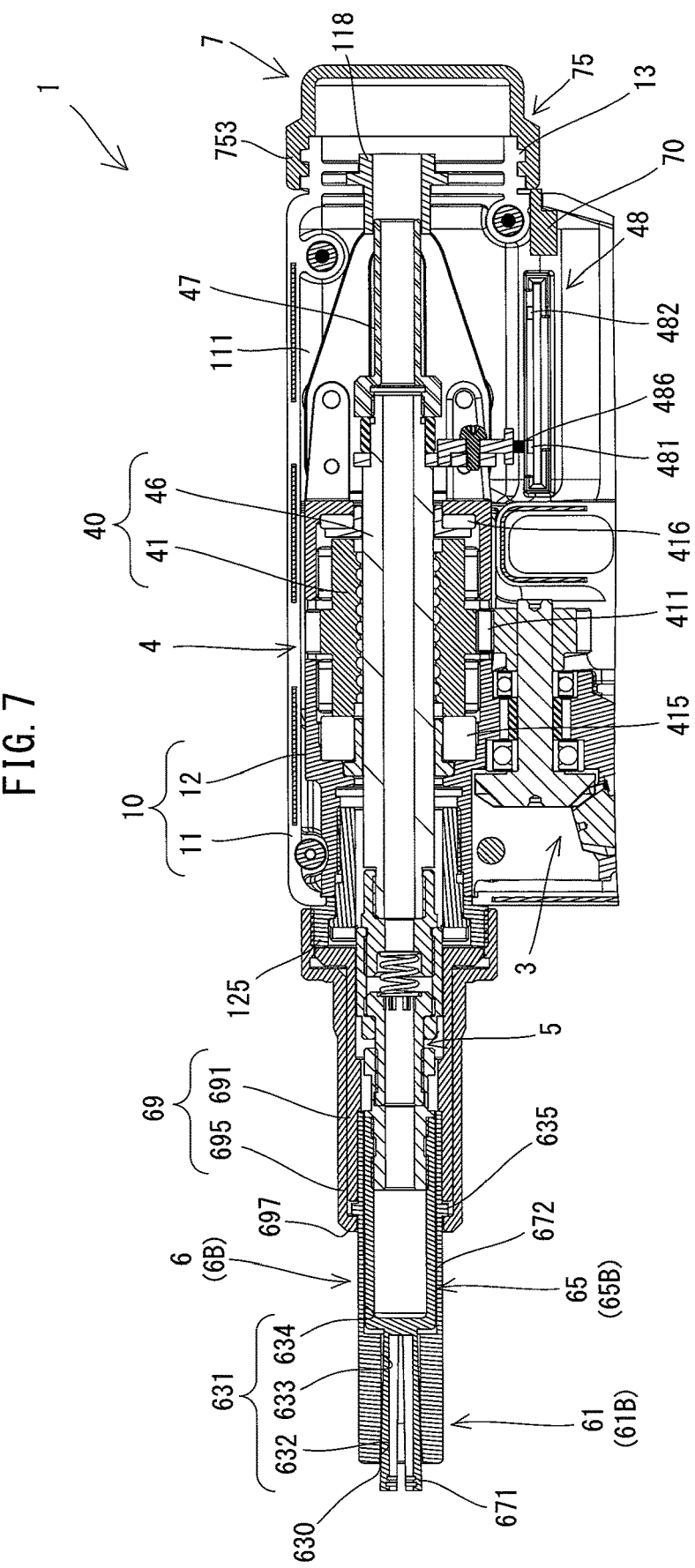
FIG. 7 is a sectional view corresponding to FIG. 5, showing the fastening tool to which a nose assembly for the non-breakage type fastener is mounted.

As shown in FIGS. 5 and 7, when removing the nose assembly 6 mounted to the housing 10, a user removes the outer sleeve 695 from the nose connection part 125 by turning the outer sleeve 695 threadedly engaged with the nose connection part 125, relative to the nose connection part 125. Thus, holding of the inner sleeve 691 and locking of the locking ribs 625 or 635 are released. Therefore, the user can remove the anvil 61 and the inner sleeve 691 by pulling out the anvil 61 and the inner sleeve 691 forward from the pin-gripping part 65 and the connection mechanism 5. Further, the user can remove the pin-gripping part 65 from the fourth connection part 54 by turning the pin-gripping part 65 threadedly engaged with the fourth connection part 54, relative to the fourth connection part 54. The user can mount the nose assembly 6 to the housing 10 by reversing the above-described process. It is noted that the anvil 61 and the inner sleeve 691 can be positioned in the axis A1 direction by abutment of the rear end of the anvil 61 with the anvil locking part 692 of the inner sleeve 691. Further, when the outer sleeve 695 is mounted, the locking ribs 625 or 635 abut on the front end part 697 of the outer sleeve 695.

The collection container 7 for the pintail 812 which has been separated from the pin 80 of the breakage type fastener 8 and a connecting structure thereof are now described with reference to FIGS. 4, 7 and 8.

As shown in FIG. 4, the collection container 7 is removably connected to the rear end portion of the outer housing 11 (the driving-mechanism housing part 111) via the container connection part 13. In the present embodiment, the collection container 7 includes at least one cylindrical member 71, which is configured to be removably mounted to the container connection part 13, and a lid member 75, which is configured to be removably mounted to the cylindrical member 71. The cylindrical member 71 is also configured to be connected to another cylindrical member 71. The user can change the capacity of the collection container 7 by changing the number of the cylindrical members 71 to be connected. In the present embodiment, the collection container 7 is formed of resin. The structures of the container connection part 13, the cylindrical member 71 and the lid member 75 are now described in this order. For convenience sake, directions of the collection container 7 are defined on the basis of the state of the collection container 7 mounted to the outer housing 11, as shown in FIG. 4.

As shown in FIG. 4, the container connection part 13 has a circular cylindrical shape and protrudes rearward so as to surround the opening 117, which is formed on the axis A1 in the rear end portion of the outer housing 11. A male thread is formed on an outer peripheral surface of the container connection part 13.

As shown in FIG. 4, the cylindrical member 71 has a circular cylindrical shape. The cylindrical member 71 has a first connection part 713 and a second connection part 715 which are respectively provided in front and rear end portions thereof. The first connection part 713 is configured to be threadedly engaged with the container connection part 13. More specifically, the first connection part 713 has a larger diameter than the other portions of the cylindrical member 71 and has a female thread formed on its inner peripheral surface to be threadedly engaged with the male thread of the container connection part 13. Further, the second connection part 715 has a male thread formed on its outer peripheral surface and having the same shape as the male thread of the container connection part 13. It is noted that having "the same shape" used herein means that the thread has the same pitch and diameter and has a screw thread of the same angle.

The lid member 75 has a bottomed circular cylindrical shape. The lid member 75 has a third connection part 753 formed on its open end, that is, on its front end. The third connection part 753 has a female thread formed on its inner peripheral surface and having the same shape as that of the first connection part 713 of the cylindrical member 71. Further, the length of the lid member 75 in the axis A1 direction is set such that the lid member 75 can cover the rear end of the extension shaft 47 when the screw shaft 46 is placed in the rearmost position, assuming that only the lid member 75 is directly mounted to the container connection part 13, as will be described later.

With such a structure, the following connection manners are provided. In a first connection manner, as shown in FIG. 4, the first connection part 713 of the cylindrical member 71 is connected to the container connection part 13 and then the third connection part 753 of the lid member 75 is connected to the second connection part 715 of the cylindrical member 71. In a second connection manner, as shown in FIG. 8, the first connection part 713 of a first cylindrical member 71 is connected to the container connection part 13, the first connection part 713 of a second cylindrical member 71 is connected to the second connection part 715, and then the third connection part 753 of the lid member 75 is connected to the second connection part 715 of the second cylindrical member 71. Further, in a third connection manner, as shown in FIG. 7, the third connection part 753 of the lid member 75 is connected to the container connection part 13.

Figure 8:
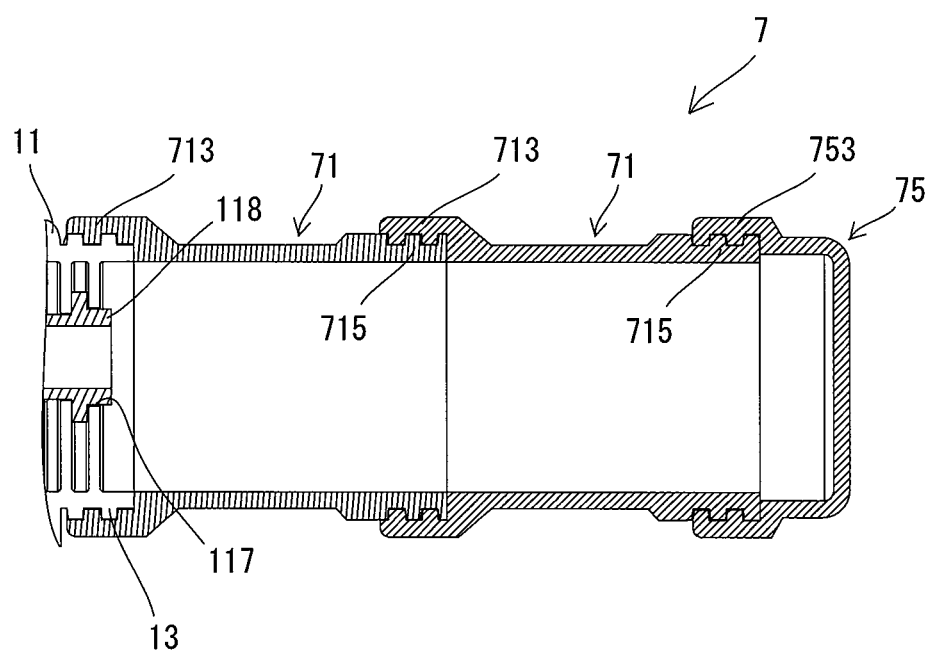
FIG. 8 is a sectional view of a collection container having two cylindrical members connected to each other.

An example of the second connection manner is shown in FIG. 8 in which two cylindrical members 71 are connected to each other, but three or more cylindrical members 71 may be connected. In this case, the third connection part 753 of the lid member 75 may be connected to the second connection part 715 of the rearmost one of the cylindrical members 71. In the present embodiment, when a plurality of cylindrical members 71 are connected, any one of the cylindrical members 71 can be mounted to the container connection part 13 since all of the cylindrical members 71 have the same structure. Thus, it is not necessary for a user to distinguish a cylindrical member 71 which should be mounted to the container connection part 13 from another cylindrical member 71 which should be mounted to the second connection part 715, which facilitates mounting the collection container 7.

The above-described first and second connection manners may be preferable when using the breakage type fastener 8 from which the pintail 812 is to be separated. The user may select either one of these connection manners according to desired frequency of discharging the pintails 812 from the collection container 7. On the other hand, in the third connection manner, the capacity of the collection container 7 is zero. Therefore, the third connection manner may be preferable when using the non-breakage type fastener 9. Further, since the collection container 7 is removably mounted to the rear end portion (the container connection part 13) of the outer housing 11, the collection container 7 can be easily mounted to and dismounted from the outer housing 11, compared with a case in which the collection container 7 is disposed on an intermediate portion of the outer housing 11.

As shown in FIG. 4, in the present embodiment, a rotation axis A2 of the collection container 7 when the collection container 7 is screwed is offset downward from the axis A1, which is a working axis of the fastening tool 1. Further, an outer radius D of the collection container 7 (a maximum distance from the rotation axis A2 to an outer surface of the collection container 7) is set such that the outer surface of the collection container 7 is arranged substantially in the same position in the up-down direction as the upper surface of the outer housing 11 when the collection container 7 is mounted to the outer housing 11. Specifically, the outer radius D of the collection container 7 is larger than the center height CH. With this structure, an internal space of the collection container 7 can be increased while the center height CH is made as small as possible.

Further, in the present embodiment, a structure for detecting the collection container 7 is provided in the fastening tool 1. Specifically, as shown in FIG. 4, a container detecting switch 70 is provided in the rear end portion of the outer housing 11, adjacent to a lower end of the container connection part 13. The container detecting switch 70 is configured as a push-type switch. The container detecting switch 70 has a switch body disposed within the rear end portion of the outer housing 11 and a plunger protruding to the outside of the outer housing 11. The container detecting switch 70 is configured to be off with the plunger being held in its initial extended state when the collection container 7 is not mounted to the container connection part 13. On the other hand, the container detecting switch 70 is turned on by the plunger being pressed by a front end of the collection container 7 when the collection container 7 (the cylindrical member 71 or the lid member 75) is mounted to the container connection part 13.

Figure 9:
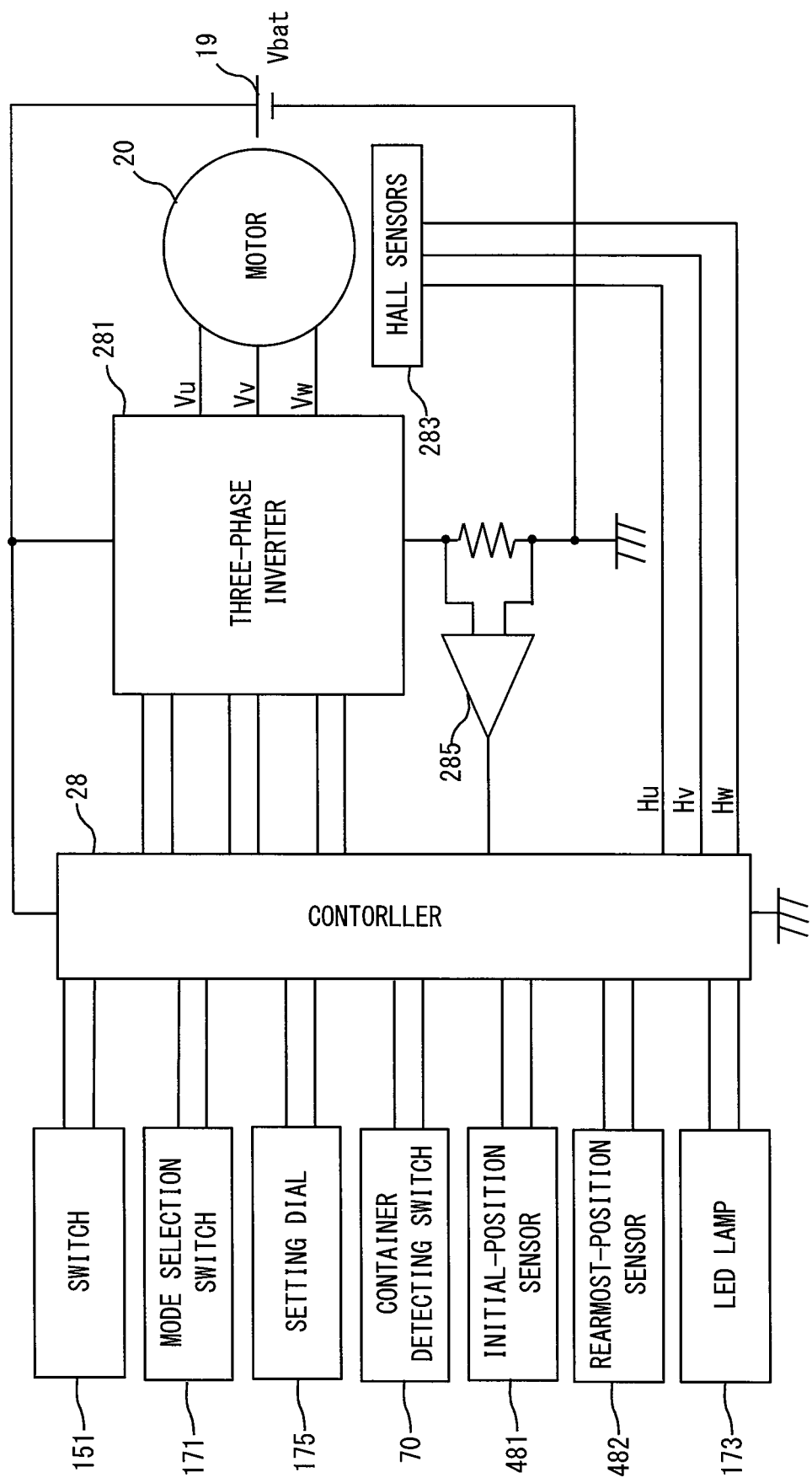
FIG. 9 is a block diagram showing an electric configuration of the fastening tool.

The electric configuration of the fastening tool 1 is now described. As shown in FIG. 9, the fastening tool 1 includes the controller 28, a three-phase inverter 281 and Hall sensors 283. The three-phase inverter 281 has a three-phase bridge circuit using six semiconductor switching elements. The three-phase inverter 281 is configured to perform switching operation of each of the switching elements of the three-phase bridge circuit according to a duty ratio indicated by a control signal from the controller 28 and thereby supply an electric current corresponding to the duty ratio to the motor 20. The controller 28 is configured to control the rotation speed of the motor 20 by controlling energization to the motor 20 via the three-phase inverter 281 based on signals indicating the rotation angle of the rotor which are inputted from the Hall sensors 283.

A current detecting amplifier 285 is also electrically connected to the controller 28. The current detecting amplifier 285 is configured to convert the driving current of the motor 20 into voltage by a shunt resistor and output a signal amplified by the amplifier to the controller 28. Although described in detail later, when the second mode for the non-breakage type fastener 9 is selected, the controller 28 controls operation of the driving mechanism 4 via the motor 20 based on this signal.

Furthermore, the switch 151, the mode selection switch 171, the setting dial 175, the container detecting switch 70, the initial-position sensor 481, the rearmost-position sensor 482 and the LED lamp 173 are electrically connected to the controller 28. The controller 28 is configured to appropriately control operation of the motor 20 and the LED lamp 173, based on output signals of the switch 151, the mode selection switch 171, the setting dial 175, the container detecting switch 70, the initial-position sensor 481 and the rearmost-position sensor 482.

The processes of fastening the workpieces W by the fastening tool 1 respectively using the breakage type fastener 8 and the non-breakage type fastener 9 are now described in this order with reference to FIGS. 4, 7, 10 to 13.

A fastening process of fastening the workpieces W using the breakage type fastener 8 is now described. First, as shown in FIG. 4, a user mounts the nose assembly 6A for the fastener 8 (see FIG. 1) to the housing 10. Further, the user presses the button A (see FIG. 3) of the mode selection switch 171. In other words, the user selects the first mode for the breakage type fastener 8 via the mode selection switch 171. In this case, the controller 28 determines that the first mode is selected based on an output signal of the mode selection switch 171, and operates as follows. It is noted that, in an initial state in which the trigger 150 is not yet depressed, the screw shaft 46 is located in the initial position (foremost position).

When an output signal of the container detecting switch 70 indicates an off-state, the controller 28 flickers the LED lamp 173 (see FIG. 3) to indicate to the user that the collection container 7 is not mounted. The user can appropriately mount the collection container 7 in response to the indication. Further, the controller 28 may be configured not to output a control signal to the three-phase inverter 281 (see FIG. 9) when the output signal of the container detecting switch 70 indicates the off-state, even if the trigger 150 is depressed and an output signal of the switch 151 indicates an on-state, so that start of driving of the motor 20 may be suspended. In this case, the pintail 812 can be reliably prevented from being discharged from a rear end of the collection passage 700 to the outside in a fastening operation performed without the collection container 7.

Figure 10:
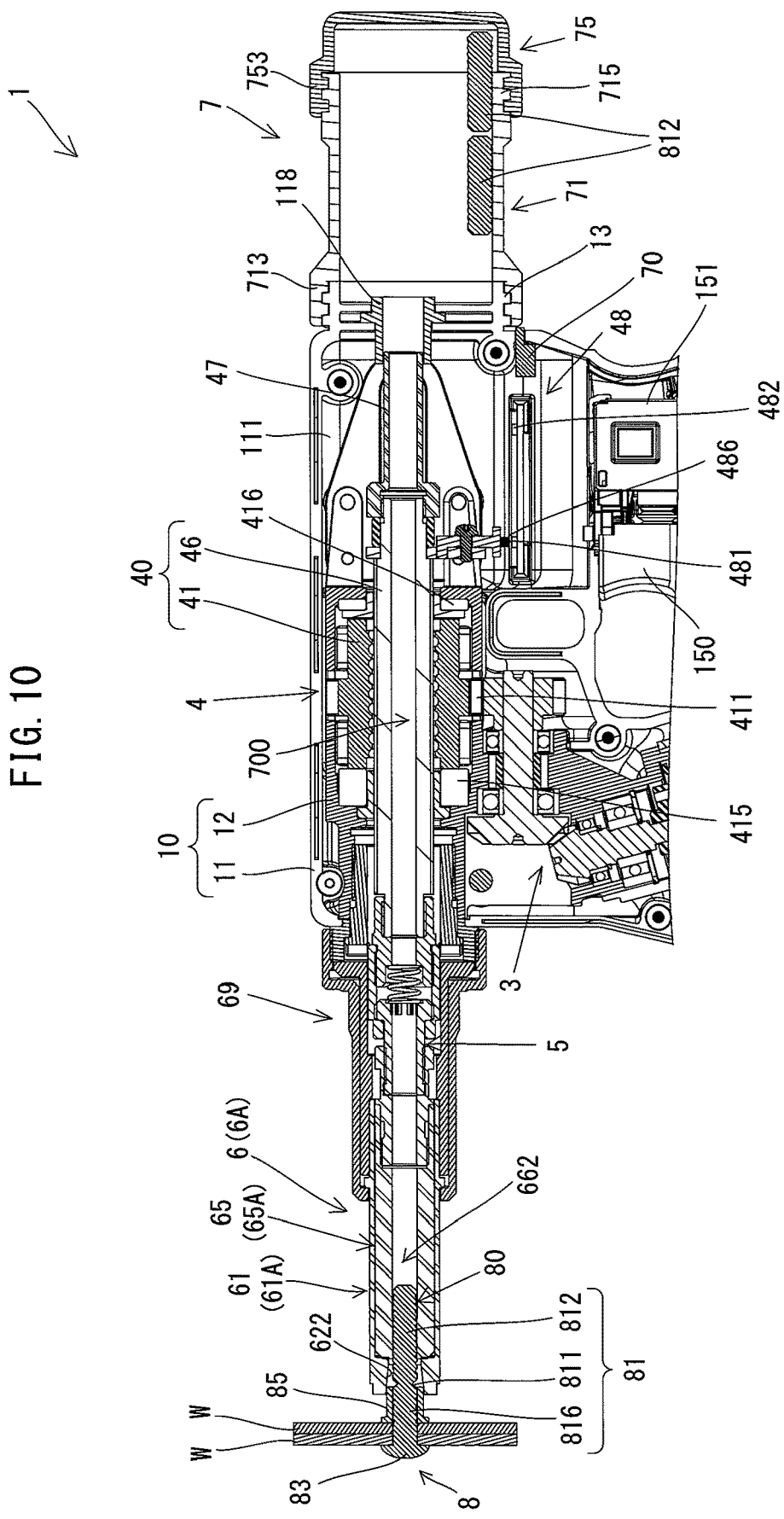
FIG. 10 is an explanatory drawing for illustrating a fastening process using the breakage type fastener.

Before depressing the trigger 150, as shown in FIG. 10, the user temporarily fixes the fastener 8 and inserts a portion of the pintail 812 into the internal passage 662 of the pin-gripping part 65A through the tapered part 622 of the anvil 61A. In the state in which the collection container 7 is mounted and the container detecting switch 70 is on, the controller 28 (see FIG. 4) starts normal rotation driving of the motor 20 (see FIG. 4) when the trigger 150 is depressed and the switch 151 is turned on. The normal rotation driving refers to a drive mode in which the motor shaft 21 (see FIG. 4) rotates in a direction to move the screw shaft 46 rearward.

When the first mode is selected, the controller 28 controls driving of the motor 20 based on a target rotation speed of the motor 20 which is preset corresponding to the normal rotation driving in the first mode and stored in a memory. Rotation of the motor 20 is transmitted to the nut 41 via the transmitting mechanism 3 and the screw shaft 46 is moved rearward from the initial position (foremost position). Accordingly, the pin-gripping part 65A is retracted rearward via the connection mechanism 5, so that the pintail 812 is also retracted rearward in the axial direction while being firmly gripped with the claws of the pin-gripping part 65A being engaged with the pulling grooves 813 (see FIG. 1).

Although the outer diameter of the collar 85 is slightly larger than the diameter of the tapered part 622 of the anvil 61A, as described above, when the pin-gripping part 65A grips the pintail 812 and strongly pulls it rearward, the collar 85 enters the tapered part 622 while being reduced in diameter. Accordingly, the collar 85 is pressed forward and radially inward and deforms, corresponding to components in an axis A1 direction and in a radial direction of the inclination angle of the tapered part 622. When the pin-gripping part 65A is further retracted rearward by the screw shaft 46, the collar 85 engaged in the anvil 61A proceeds further deeper into the tapered part 622. As a result, the collar 85 is further strongly pressed forward and radially inward and the workpieces W are firmly clamped between the head 83 and the collar 85, while the inner peripheral surface of the collar 85 is firmly crimped (swaged) into the swaging grooves 817 (see FIG. 1) formed in the base part 816. By this crimping, the collar 85 is engaged into the swaging grooves 817 by plastic deformation, which completes swaging the collar 85 onto the shaft part 81 (the base part 816).

A strong load is required to swage the collar 85 to the shaft part 81 (the base part 816). This load is applied to the nut 41 as an axial force in the forward direction via the pin-gripping part 65A, the connection mechanism 5 and the screw shaft 46. In the present embodiment, however, the front end of the nut 41 is supported by the inner housing 12 via the thrust rolling bearing 415. Therefore, the thrust rolling bearing 415 can reliably receive the axial force in the forward direction while rolling around the axis A1 so as to allow the nut 41 to rotate, thereby preventing this axial force from impeding smooth rotation of the nut 41.

As described above, the small-diameter part 811 of the pin 80 is configured to have such strength that it is to be broken when the axial force (pulling force) reaches a specified force which is larger than a force required to swage the collar 85 onto the base part 816. Therefore, when the screw shaft 46 is further moved rearward after the collar 85 is swaged onto the base part 816, the shaft part 81 is broken at the small-diameter part 811 and the pintail 812 is separated from the base part 816 swaged by the collar 85 at the point when the pulling force reaches the specified force and before the screw shaft 46 reaches the rearmost position. By separation of the pintail 812, the pin-gripping part 65A gripping the pintail 812 receives rearward impact, but the third connection part 53 moves in the axis A1 direction relative to the second connection part 52 while receiving the elastic force of the coil spring 55, so that the impact can be effectively relieved.

Figure 11:
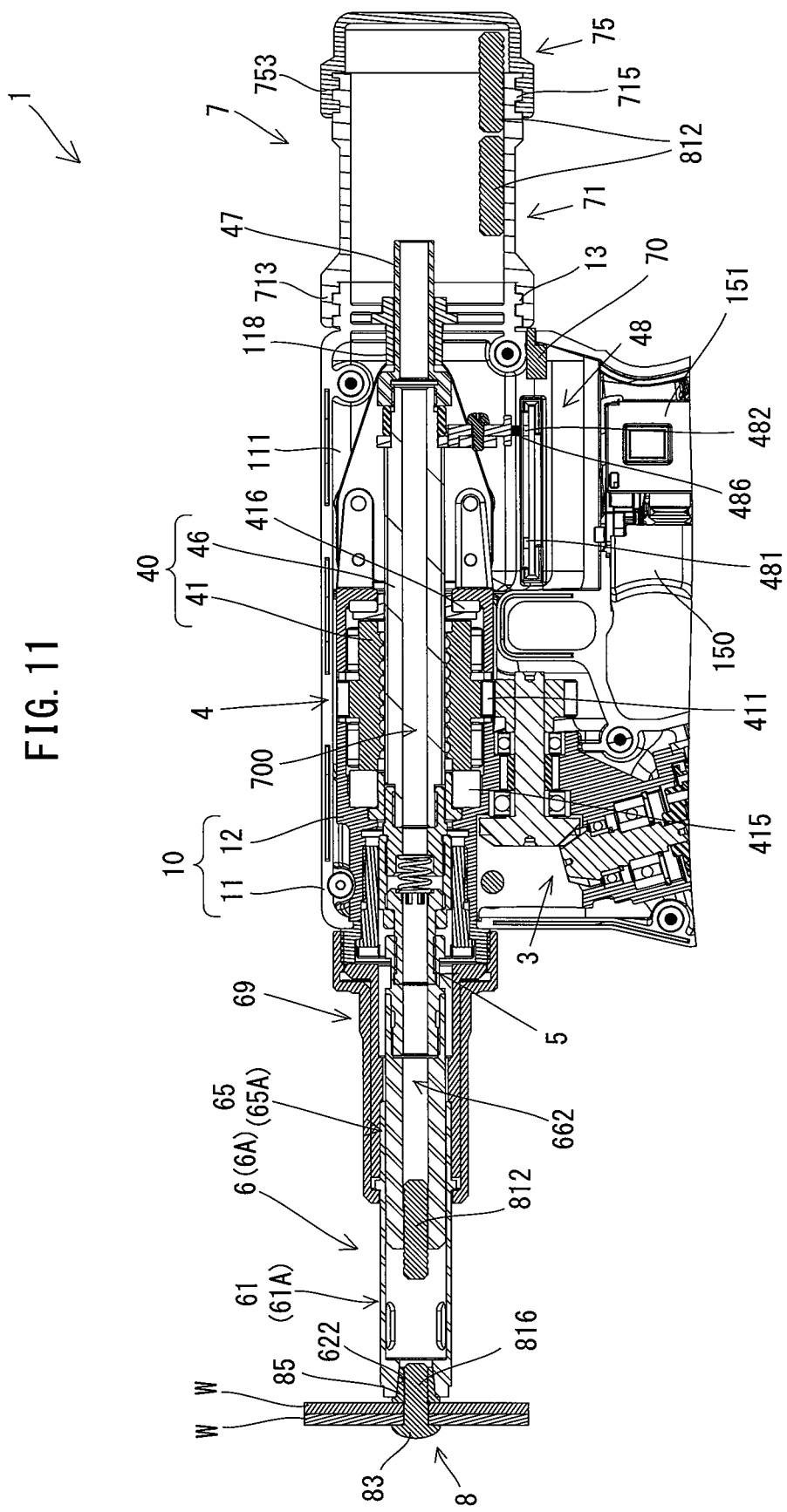
FIG. 11 is another explanatory drawing for illustrating the fastening process using the breakage type fastener.

When the screw shaft 46 is further moved rearward with the separated pintail 812 being gripped by the pin-gripping part 65A and reaches the rearmost position as shown in FIG. 11, the magnet 486 enters the detection range of the rearmost-position sensor 482. Upon determining that the screw shaft 46 has reached the rearmost position based on an output signal of the rearmost-position sensor 482, the controller 28 (see FIG. 4) stops driving of the motor 20 to stop rearward movement of the screw shaft 46, which completes the process of fastening the workpieces W using the fastener 8.

Thereafter, the controller 28 performs processing for returning the pin-gripping part 65A to the initial state, in order to prepare for the next fastening process. First, the controller 28 starts reverse rotation driving of the motor 20 when the user's depressing operation of the trigger 150 is released and the switch 151 is turned off. The reverse rotation driving refers to a drive mode in which the motor shaft 21 rotates in a direction to move the screw shaft 46 forward. The controller 28 controls driving of the motor 20 based on a target rotation speed of the motor 20 which is preset corresponding to the reverse rotation driving in the first mode and stored in the memory. Rotation of the motor 20 is transmitted to the nut 41 via the transmitting mechanism 3 and the screw shaft 46 is moved forward from the rearmost position. Accordingly, the pin-gripping part 65A is moved forward via the connection mechanism 5.

Upon determining that the screw shaft 46 has reached the initial position (foremost position) based on an output signal of the initial-position sensor 481, the controller 28 stops driving of the motor 20 to stop the forward movement of the screw shaft 46. In many cases, the pintail 812 is returned to the initial position together with the pin-gripping part 65A. At this time, the claws of the pin-gripping part 65A are loosely engaged with the pulling grooves 813 (see FIG. 1) of the pintail 812, so that the pintail 812 is allowed to be released from the pin-gripping part 65A. The collection passage 700 allows passage of the pintail 812 which is pushed rearward by a pintail 812 of another fastener 8 in the next fastening process, or passage of the pintail 812 which is disengaged from the pin-gripping part 65A when the fastening tool 1 is moved. As shown in FIGS. 10 and 11, the collection container 7 stores the pintail 812 which has reached the collection container 7 through the collection passage 700. In the present embodiment, the collection passage 700 extends linearly along the axis A1, thereby allowing smooth passage of the pintail 812.

A fastening process of fastening the workpieces W using the non-breakage type fastener 9 is now described. First, as shown in FIG. 7, a user mounts the nose assembly 6B for the fastener 9 (see FIG. 2) to the housing 10. It is noted that, in the case of the fastener 9, the pin 90 is not configured to be broken. Therefore, the user may mount only the lid member 75 of the collection container 7 to the container connection part 13, in order to shorten the whole length of the fastening tool 1. Further, the user manually operates the setting dial 175 (see FIG. 3) to set a threshold for the driving current of the motor 20 (see FIG. 4) which is to be used by the controller 28 to determine completion of swaging. The user can arbitrarily set the threshold according to a load required for swaging, that is, a pulling force which is required, depending on work specifications such as the material or specifications of the workpieces W and the material or specifications of the fastener 9.

In the present embodiment, the setting dial 175 is configured such that the threshold can be steplessly adjusted according to the rotation position (the amount of rotation from a reference position). Numerical values are indicated stepwise (for example, in six steps) as a guide on a top surface of the setting dial 175. The controller 28 specifies the set threshold (the amount of rotation from the reference position) based on an output signal from the setting dial 175 and stores it in the memory.

Further, the user presses the B button (see FIG. 3) of the mode selection switch 171. In other words, the user selects the second mode for the non-breakage type fastener 9 via the mode selection switch 171. In this case, the controller 28 determines that the second mode is selected based on the output signal of the mode selection switch 171 and operates as follows.

In the present embodiment, when the second mode is selected, the controller 28 does not determine whether the collection container 7 is mounted. When only the lid member 75 is mounted, however, the container detecting switch 70 is turned on by the lid member 75. When the screw shaft 46 is placed in the rearmost position, the rear end of the extension shaft 47 protrudes rearward from the guide tube 118. Therefore, it may be preferable if the lid member 75 is mounted. Accordingly, like in the first mode, the controller 28 may perform processing for indicating by the LED lamp 173 and/or suspending start of driving of the motor 20.

Figure 12:
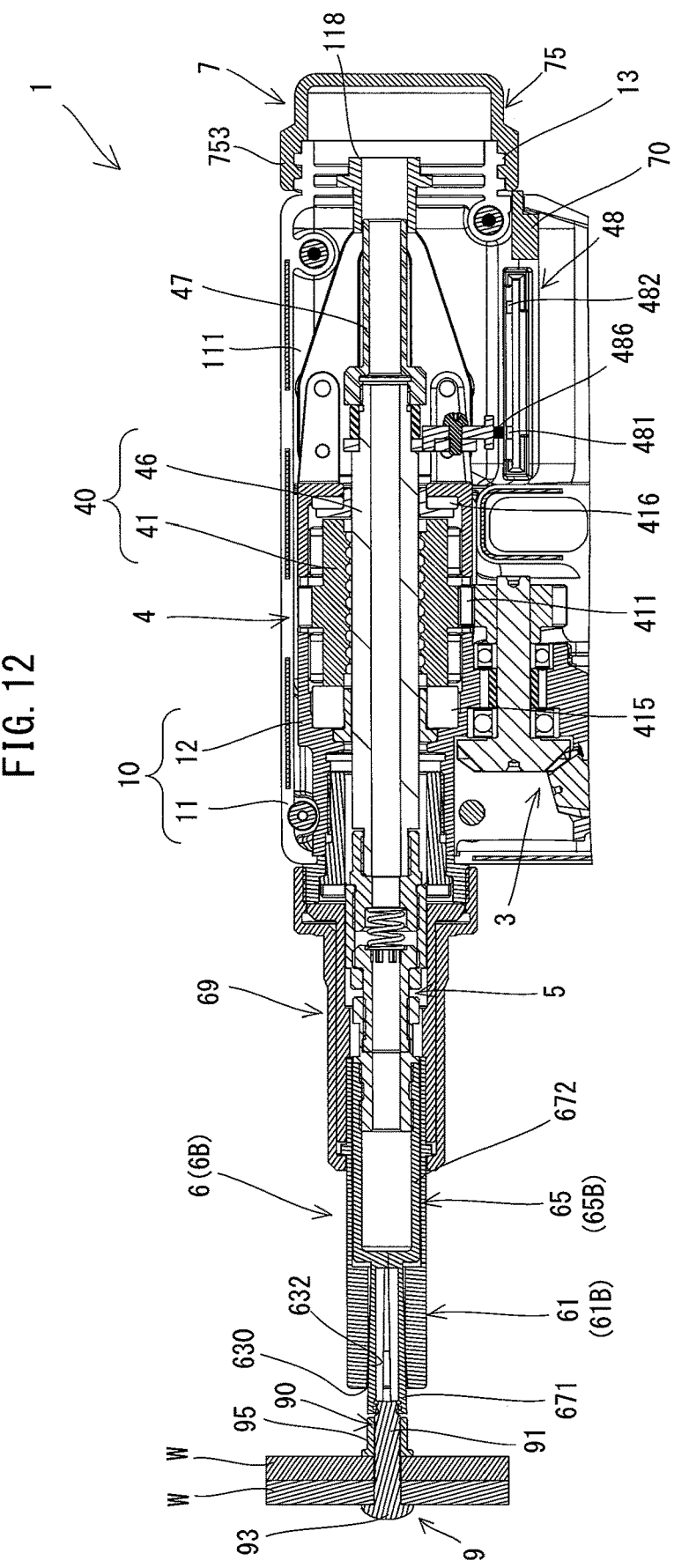
FIG. 12 is an explanatory drawing for illustrating a fastening process using the non-breakage type fastener.

Before depressing the trigger 150 (see FIG. 4), as shown in FIG. 12, the user temporarily fixes the fastener 9 and inserts a rear end portion of the shaft part 91 into the inside of the gripping claws 671 protruding from the open end 630 of the anvil 61B, and then engages the gripping claws 671 with the pulling groove 913 (see FIG. 2). The controller 28 (see FIG. 4) starts normal rotation driving of the motor 20 when the trigger 150 is depressed and the switch 151 (see FIG. 4) is turned on. The controller 28 controls driving of the motor 20 based on a target rotation speed of the motor 20 which is preset corresponding to the normal rotation driving in the second mode and stored in the memory. It is noted that the controller 28 may instead set the target rotation speed according to the threshold set via the setting dial 175.

Rotation of the motor 20 is transmitted to the nut 41 via the transmitting mechanism 3 and the screw shaft 46 is moved rearward from the initial position (foremost position). Accordingly, the pin-gripping part 65B is retracted rearward via the connection mechanism 5, so that the rear end portion of the shaft part 91 is also retracted rearward in the axial direction while being firmly gripped with the gripping claws 671 being engaged with the pulling groove 913 (see FIG. 2).

Figure 13:
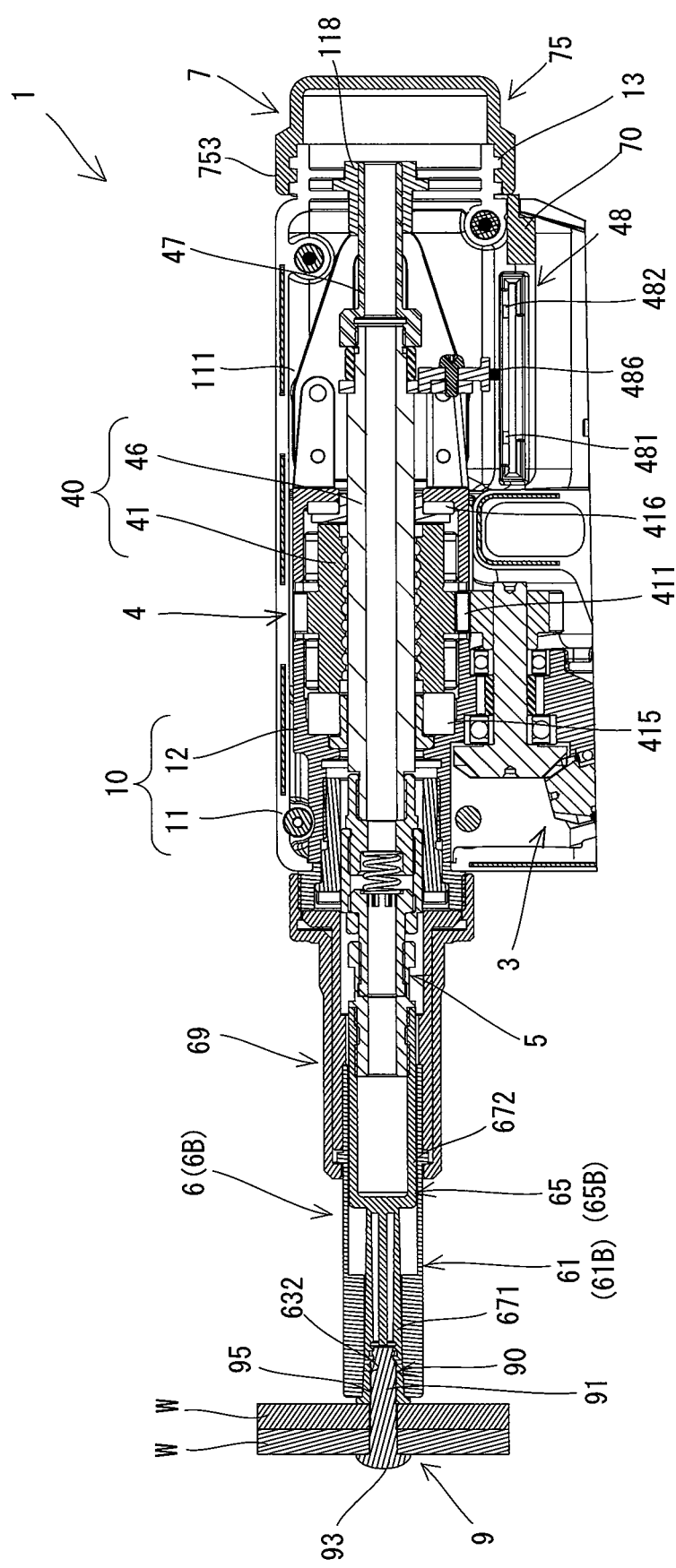
FIG. 13 is another explanatory drawing for illustrating the fastening process using the non-breakage type fastener.

Like in the case using the fastener 8, when the pin-gripping part 65B grips the rear end portion of the shaft part 91 and strongly pulls it rearward, the collar 95 enters the tapered part 632 while being reduced in diameter. Accordingly, the collar 95 is strongly pressed forward and radially inward and deforms as the pin-gripping part 65B is retracted rearward. At this time, the thrust rolling bearing 415 acts like in the first mode. When the screw shaft 46 is further moved rearward and the collar 95 becomes unable to be proceed into the bore 631 any further (reaches a final stage of swaging) as shown in FIG. 13, the driving state of the motor 20 (see FIG. 4) rapidly changes. Specifically, a load on the motor 20 rapidly increases. Therefore, in the present embodiment, the controller 28 (see FIG. 4) determines completion of swaging based on the driving current of the motor 20, which is a physical quantity which corresponds to the load on the motor 20.

Specifically, the controller 28 calculates a driving current value of the motor 20 based on an output signal of the current detecting amplifier 285 (see FIG. 9), and compares it with a specified threshold which is preset and stored in the memory. It is noted that the threshold is appropriately set by a user's manual operation of the setting dial 175 (see FIG. 3) as described above. When determining that the driving current value of the motor 20 exceeds the threshold, the controller 28 determines that swaging has been completed and stops driving of the motor 20 via the three-phase inverter 281 (see FIG. 9), which completes the process of fastening the workpieces W using the fastener 9. In the present embodiment, when the driving current value exceeds the specified threshold, an electric brake is actuated to quickly stop the motor 20. In place of the electric brake, a mechanical brake may be used to quickly stop the motor 20.

Thereafter, the controller 28 performs processing for returning the pin-gripping part 65B to the initial state, in order to prepare for the next fastening process. First, the controller 28 starts reverse rotation driving of the motor 20 when the user's depressing operation of the trigger 150 is released and the switch 151 is turned off. The controller 28 controls driving of the motor 20 based on a target rotation speed of the motor 20 which is preset corresponding to the reverse rotation driving in the second mode and stored in the memory. Rotation of the motor 20 is transmitted to the nut 41 via the transmitting mechanism 3 and the screw shaft 46 is moved forward from the position in which further rearward movement of the screw shaft 46 has been stopped. Accordingly, the pin-gripping part 65B gripping the rear end portion of the shaft part 91 is moved forward via the connection mechanism 5.

The collar 95 is firmly crimped (swaged) to the tapered part 632 of the anvil 61B by a strong load applied when swaged to the shaft part 91. Therefore, compared with the case of moving forward the pin-gripping part 65A gripping the separated pintail 812 in the first mode, a considerably strong load is required to move forward the pin-gripping part 65B gripping the rear end portion of the shaft part 91 and release the collar 95 from the anvil 61B. This load is applied to the nut 41 as an axial force in the rearward direction via the gripping claws 671, the base part 672, the connection mechanism 5 and the screw shaft 46. In the present embodiment, however, the rear end of the nut 41 is supported by the inner housing 12 via the thrust rolling bearing 416. Therefore, the thrust rolling bearing 416 can reliably receive the axial force in the rearward direction while rolling around the axis A1 so as to allow the nut 41 to rotate, thereby preventing this axial force from impeding smooth rotation of the nut 41.

Compared with the axial force required for the swaging operation, the axial force required to release the collar 95 from the anvil 61B is relatively small. Therefore, in the present embodiment, as the thrust rolling bearing 416 to be disposed on the rear end side of the nut 41, a thrust needle bearing is employed which occupies a smaller space than a ball bearing.

Upon determining that the screw shaft 46 has reached the initial position (foremost position) based on an output signal of the initial-position sensor 481, the controller 28 stops driving of the motor 20 to stop the forward movement of the screw shaft 46. When the screw shaft 46 is returned to the initial position, as shown in FIG. 12, the gripping claws 671 protrude forward from the open end 630 of the bore 631 and the collar 95 is released forward from the anvil 61B, and the rear end portion of the shaft part 91 is allowed to be released from the gripping claws 671.

In the present embodiment, the maximum movable range of the screw shaft 46 in the axis A1 direction is set to correspond to the distance between the initial-position sensor 481 and the rearmost-position sensor 482. In other words, the distance of movement of the magnet 486 from a position corresponding to the initial-position sensor 481 to a position corresponding to the rearmost-position sensor 482 is given as the maximum movable range of the screw shaft 46. For example, if the trigger 150 is depressed while the gripping claws 671 are not engaged with the shaft part 91, the driving current of the motor 20 which is substantially under no load does not reach the specified threshold. Consequently, the screw shaft 46 can move rearward until the magnet 486 reaches the detection range of the rearmost-position sensor 482. On the other hand, when the gripping claws 671 grip the shaft part 91 and the above-described swaging operation is performed, in the process leading to completion of the swaging operation, the driving current of the motor 20 rapidly increases. Then, before the magnet 486 reaches the detection range of the rearmost-position sensor 482, the driving current exceeds the threshold, and at this point of time, driving of the motor 20 is stopped.

As described above, in the fastening tool 1 of the present embodiment, the driving mechanism 4 is driven by the electric motor 20, so that the structure of the whole fastening tool 1 can be made compact, compared with a structure using a driving mechanism utilizing fluid pressure. Further, the operation mode of the driving mechanism 4 can be selectively switched between the first mode for the breakage type fastener 8 and the second mode for the non-breakage type fastener 9. The first mode in which the fastening process is completed by breaking the shaft part 81 can be used for the breakage type fastener 8, but not for the non-breakage type fastener 9. Therefore, in the present embodiment, focusing on the fact that the driving state of the motor 20 changes (the driving current value of the motor 20 increases) as the relative axial force applied to the pin 90 and the collar 95 increases along with progress of the swaging operation when the driving mechanism 4 is driven by the motor 20, the second mode is provided which can be used for the non-breakage type fastener 9. Thus, the fastening tool 1 can be used with either the breakage type fastener 8 or the non-breakage type fastener 9 by switching the operation mode.

Further, in the fastening tool 1 of the present embodiment, a user may change the capacity of the collection container 7 depending on his/her needs since the capacity of the collection container 7 for the pintails 812 is variable. For example, when desiring to reduce the frequency of discharging the pintails 812 from the collection container 7, the user may increase the capacity of the collection container 7 by increasing the number of cylindrical members 71 to be connected. On the other hand, for example, when using a relatively small number of the fasteners 8, the user need not increase the capacity of the collection container 7, and may minimize the number of the cylindrical members 71 to be connected. Thus, the fastening tool 1 is realized having the collection container 7 for the pintail 812 which is capable of more flexibly meeting user's needs.

The above-described embodiment is a mere example and a fastening tool according to the present invention is not limited to the structure of the fastening tool 1 of the exemplary embodiment. For example, the following modifications may be made. One or more of these modifications may be employed in combination with the fastening tool 1 of the above-described embodiment or the claimed invention. In the following description, components which are basically identical to those in the fastening tool 1 of the above-described embodiment are given the same numerals and are not described or only briefly described.

(Modification to the Collection Container)

A collection container 701 according to a modification is now described with reference to FIGS. 14 and 15.

Figure 14:
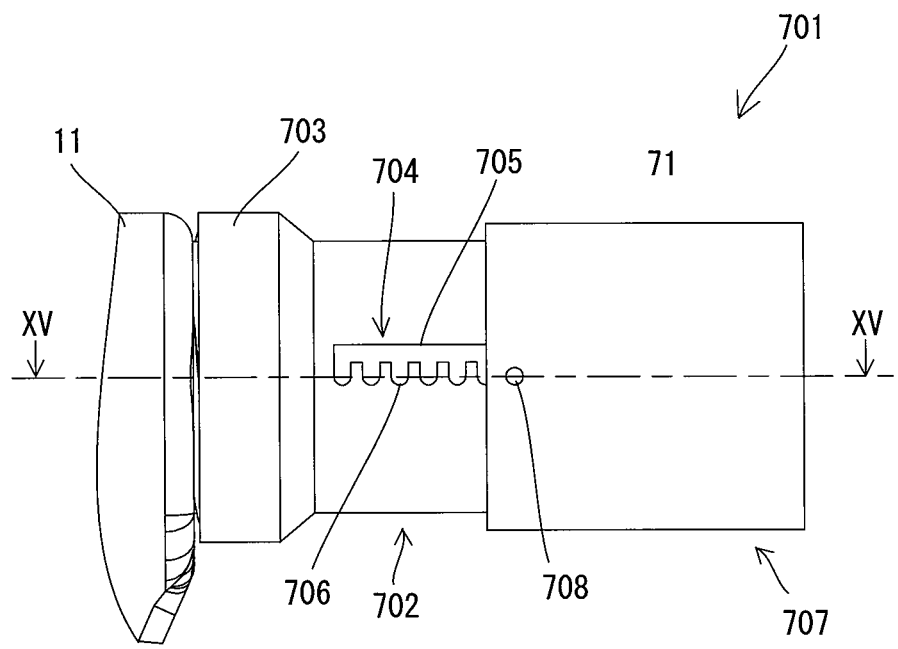
FIG. 14 is a left side view of a collection container according to a modification.
Figure 15:
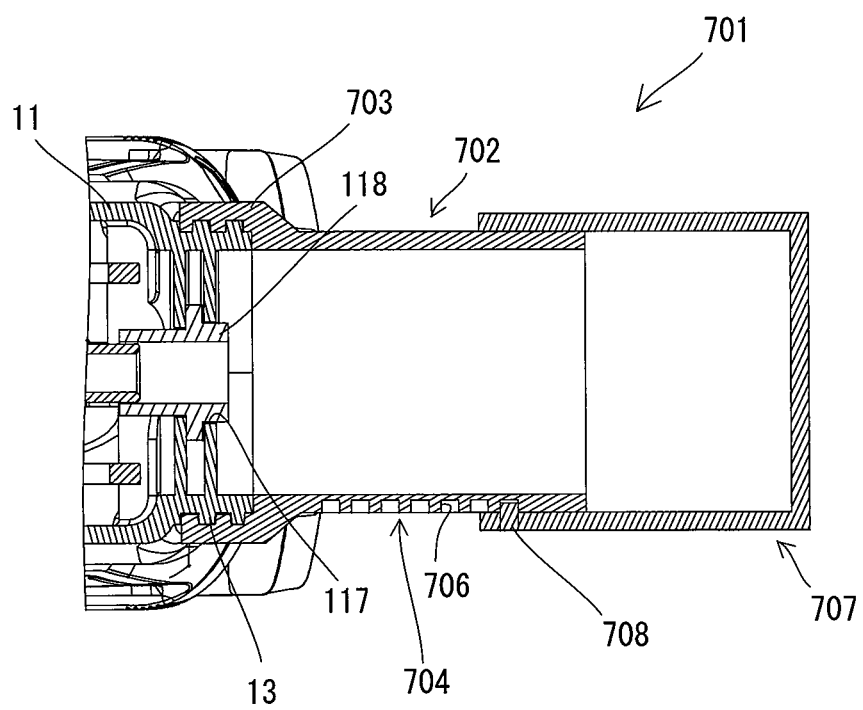
FIG. 15 is a sectional view taken along line XV-XV in FIG. 14.

As shown in FIGS. 14 and 15, the collection container 701 is configured to be removably mounted to the outer housing 11 (specifically, the container connection part 13) of the above-described embodiment. The collection container 701 includes a first member 702 and a second member 707 which is connected to the first member 702 so as to be movable at least in an axial direction of the first member 702 (the axis A1 direction, the front-rear direction of the fastening tool 1) relative to the first member 702. In the present modification, the collection container 701 is formed of resin.

The first member 702 has a circular cylindrical shape, and is configured to be removably mounted to the outer housing 11. More specifically, a connection part 703 similar to the first connection part 713 (see FIG. 4) of the cylindrical member 71 is provided in a front end portion of the first member 702. A female thread is formed on an inner peripheral surface of the connection part 703 to be threadedly engaged with the male thread of the container connection part 13. Further, the first member 702 has a locking groove 704. The locking groove 704 includes a guide part 705 and a plurality of locking parts 706. The guide part 705 linearly extends substantially in the front-rear direction (the axial direction of the first member 702). The locking parts 706 are formed by notches (cutouts) cut in a direction orthogonal to the guide part 705. In the present embodiment, seven locking parts 706 are equidistantly arranged in the front-rear direction.

The second member 707 has a bottomed circular cylindrical shape. As shown in FIG. 15, the second member 707 has a circular columnar locking projection 708 protruding radially inward. The locking projection 708 may be integrally formed with the second member 707, or separately formed as a pin (for example, formed of metal or rubber) and fixed to the second member 707.

In the locking groove 704 of the first member 702, the guide part 705 extending in the front-rear direction has a width (length in a circumferential direction (the up-down direction in FIG. 14)) slightly larger than the diameter of the locking projection 708. When the locking projection 708 is loosely disposed within the guide part 705, the locking projection 708 can move along the guide part 705 in the front-rear direction relative to the first member 702.

As for the locking parts 706 of the locking groove 704 of the first member 702, a portion of each locking part 706 adjacent to the guide part 705 has a width substantially equal to the diameter of the locking projection 708, while a portion on the side of a closed end of the locking part 706 has a width slightly larger than the diameter of the locking projection 708. With such a structure, when the locking projection 708 is moved from the guide part 705, through the adjacent portion of the locking part 706, to be placed close to the closed end within the locking part 706, the locking projection 708 is held within the locking part 706 without returning to the guide part 705, unless a user operates to do so. In a case where the locking projection 708 is formed as an elastic pin (such as a rubber pin), the locking part 706 may be formed to have a uniform width.

After mounting the collection container 701 to the outer housing 11 by threadedly engaging the connection part 703 with the container connection part 13, the user can change the capacity of the collection container 701 by changing the position of the second member 707 in the axis A1 direction relative to the first member 702. Specifically, for the capacity change, the user may turn the second member 707 upward in the circumferential direction to disengage the locking projection 708 from one of the locking parts 706, subsequently move the locking projection 708 to a desired position along the guide part 705 in the axis A1 direction, and then lock the locking projection 708 to a different one of of the locking parts 706. The user can change the capacity of the collection container 701 by such a simple method. Further, when the collection container 701 is formed of transparent resin, the user can visually check the amount of the pintails 812 stored in the collection container 701, and can therefore increase the capacity of the collection container 701 as necessary in the process of fastening a number of the fasteners 8.

In a further modification, in place of the structure in which the locking groove 704 is provided in the first member 702, multistep locking projections may be provided to extend in the axial direction (the axis A1 direction, the front-rear direction) on an outer peripheral surface of the first member 702, while a flexible locking claw which can be locked to any one of the locking projections may be provided on the second member 707. Alternatively, a male thread may be formed substantially over the whole length of an outer peripheral surface of the first member 702, and a female thread which can be threadedly engaged with the male thread of the first member 702 may be formed substantially over the whole length of an inner peripheral surface of the second member 707. In this case, the position of the second member 707 in the axial direction (the axis A1 direction, the front-rear direction) relative to the first member 702 can be steplessly changed. In other words, the capacity of the collection container can be steplessly adjusted. Further, for example, a bellows-like collection container which can expand and contract in the axis A1 direction may also be employed. All of the collection containers 7, 701 and the above-described exemplary modifications are examples that the volume (or the outer shape) of the collection container itself changes according to the capacity (or the amount of the pintails 812 which can be stored inside the collection container). However, it may be configured such that the volume of the collection container itself does not change and only the capacity is variable.

The collection container 7 or 70 need not necessarily be removable from the outer housing 11 in its entirety. For example, one of the cylindrical members 71 of the collection container 7 may be fixed to the outer housing 11, and another cylindrical member 71 or the lid member 75 may be removably mounted to the fixed cylindrical member 71. The first member 702 of the collection container 701 may be fixed to the outer housing 11, and an openable/closable lid part may be provided on a rear end surface of the second member 707. Further, the manner of mounting/dismounting the collection container 7 or 701 to/from the housing 11 and the manner of connecting the cylindrical members 71 or connecting the cylindrical member 71 and the lid member 75 are not limited to threaded engagement, but may be changed to engagement between a projection and a recess or bayonet coupling. Further, in the case of threaded engagement, arrangement relation between the male thread and the female thread in the above-described example may be reversed.

In the above-described embodiment, all the cylindrical members 71 of the collection container 7 have the same structure. In this case, as described above, the cylindrical members 71 can be readily mounted without the need of being distinguished from each other, and in addition, the cylindrical members 71 can be manufactured by using the same mold, which is also preferable in cost. In a case in which a plurality of members are selectively connected to change the capacity like in the collection container 7, however, all of the connectable members need not have the same structure. For example, in each of the members, at least one of the capacity, shape, material and structure for connection may be different.

The collection passage 700 need not be linearly provided along the axis A1. For example, the mounting position of the collection container 7 or 701 to the outer housing 11 is not limited to the rear end portion of the outer housing 11, but may be changed to such a position that the pintail 812 can be appropriately discharged to the outside of the housing 10, according to the structure of the driving mechanism 4 and arrangement of the collection passage 700.

(Modification to the Structure for Detecting the Collection Container)

As a modification to the structure for detecting the collection container 7, a container detection sensor 791 is now described with reference to FIG. 16.

Figure 16:
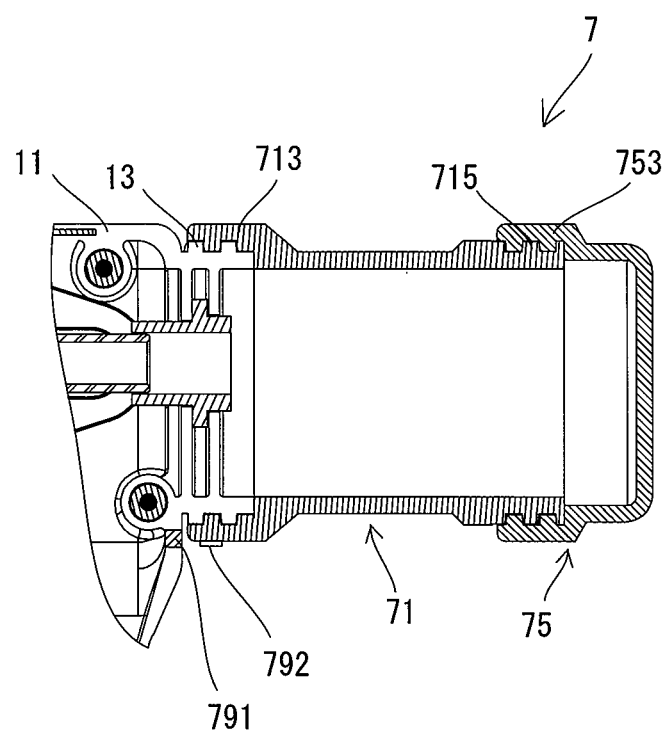
FIG. 16 is a sectional view for illustrating a container detection sensor according to another modification.

As shown in FIG. 16, the container detection sensor 791 is disposed in the rear end portion of the outer housing 11 like the container detecting switch 70 (see FIG. 4). The container detection sensor 791 is configured to detect the collection container 7 in a non-contact manner. Specifically, the container detection sensor 791 is configured as a magnetic sensor, like the initial-position sensor 481 and the rearmost-position sensor 482 (see FIG. 4), and arranged to face rearward through a through hole formed in the outer housing 11. Further, a magnet 792 is mounted on an outer surface of the collection container 7 (specifically, the first connection part 713) so as to face the container detection sensor 791 when the first connection part 713 is completely threadedly engaged with the container connection part 13.

When the collection container 7 is mounted to the outer housing 11, the magnet 792 is placed within the detection range of the container detection sensor 791 and detected by the container detection sensor 791. In this modification, the controller 28 (see FIG. 4) can also appropriately perform processing such as flickering the LED lamp 173 (see FIG. 3) and/or suspending start of driving of the motor 20, based on an output signal from the container detection sensor 791.

Further, the structure for detecting the collection container 7 in a non-contact manner is not limited to the magnetic sensor, but, for example, a well-known photoelectric sensor having a light projecting part and a light receiving part may be used. The structure for detecting the collection container 7 may preferably be provided, in order to prevent the pintail 812 from being discharged to the outside, but it may be omitted. In a case in which an indication is given based on detection results, in place of the above-described indication by light via the LED-lamp 173, an indication by sound via a speaker or an indication by image via a display may be adopted, or two or more of these indications may be adopted in combination. Further, when the collection container 7 or 701 is not mounted, only the processing for suspending start of driving of the motor 20 may be performed without such indication.

(Modification to the Structure for Selectively Switching the Operation Mode)

A modification to the structure for selectively switching the operation mode between the first mode for the breakage type fastener 8 and the second mode for the non-breakage type fastener 9 is now described.

First, a first modification is described in which the operation member for selecting the operation mode is modified. In the above-described embodiment, the mode selection switch 171 (see FIG. 3) provided on the outer housing 11 of the fastening tool 1 is used to select the operation mode. However, the fastening tool 1 may be configured such that the setting dial 175 (see FIG. 3) is manually operated by a user not only to set the threshold for the driving current value in the above-described embodiment but also to select the operation mode. In this case, the mode selection switch 171 may be omitted in the fastening tool 1.

In the present modification, when determining that the rotation position of the setting dial 175 is located within a specified range from a reference position based on an output signal from the setting dial 175, the controller 28 determines that the second mode is selected. Then, a threshold corresponding to the rotation position is set, and like in the above-described embodiment, the fastening process is completed based on the result of comparison between the driving current value and the threshold. On the other hand, when the rotation position of the setting dial 175 is located out of the specified range, the controller 28 determines that the first mode is selected and completes the fastening process by breaking the pin 80.

More specifically, for example, a scale indicating a plurality of numerical values may be provided on the setting dial 175 and one of the numerical values can be defined as a boundary value when switching between the second mode and the first mode. In this case, a user can select the second mode and set the threshold for the driving current by steplessly turning the setting dial 175 to a position indicating a numerical value smaller than the boundary value on the scale. On the other hand, the user can select the first mode by turning the setting dial 175 to a position indicating a numerical value larger than the boundary value. Thus, in the present modification, the two functions of selecting the operation mode and setting the threshold for the driving current value which is to be used to determine completion of swaging in the second mode can be realized by the single setting dial 175.

As the operation member for selecting the operation mode, apart from the mode selection switch 171 and the setting dial 175 (see FIG. 3), for example, a touch panel may also be employed.

A second modification to the structure for selectively switching the operation mode is now described. In the second modification, the controller 28 is configured to automatically switch the operation mode between the first mode and the second mode according to the type of the nose assembly 6 mounted to the housing 10.

Figure 17:
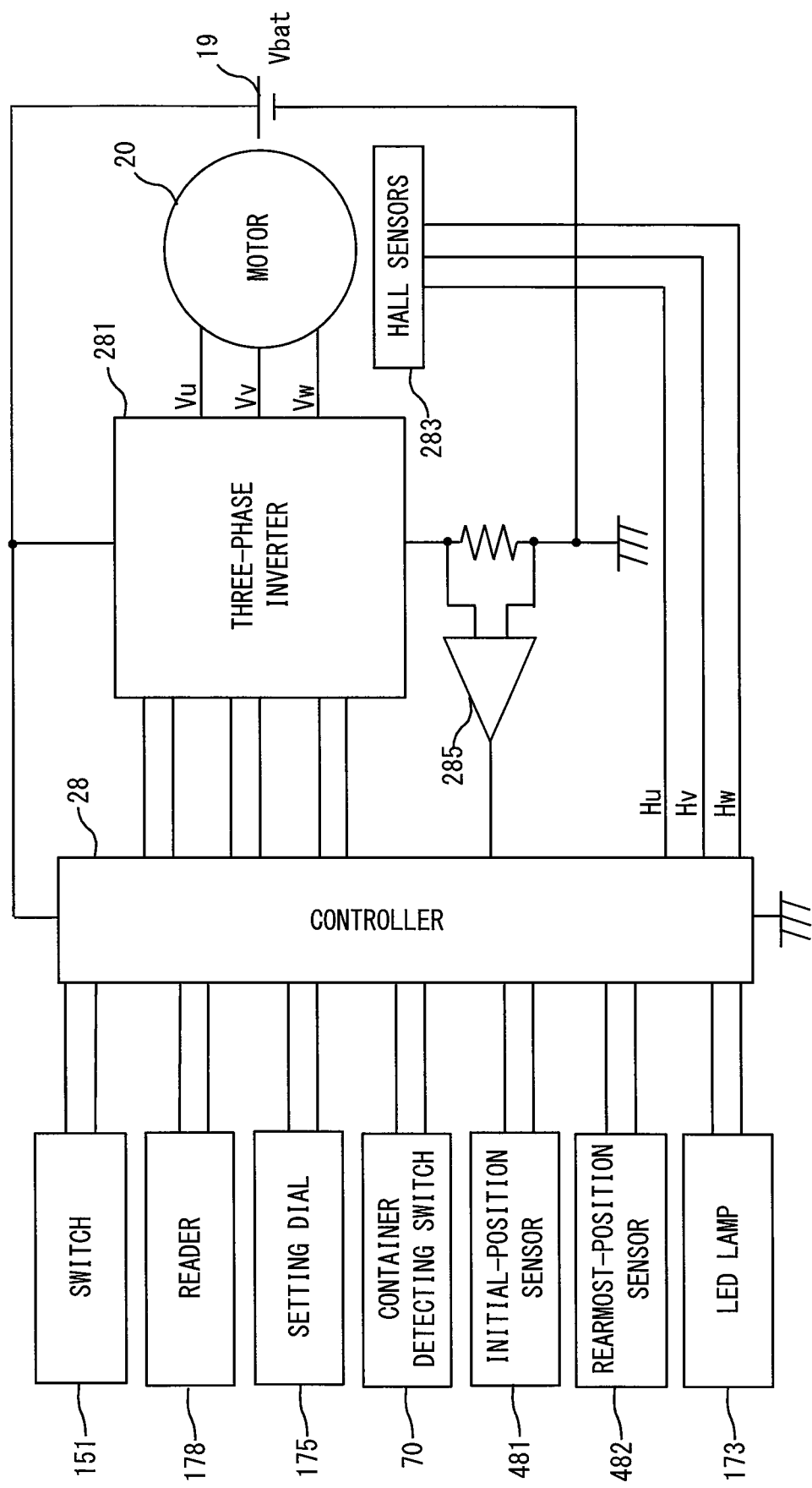
FIG. 17 is a block diagram showing an electric configuration of a fastening tool according to yet another modification.

Specifically, as shown in FIG. 17, in a fastening tool 101 according to the second modification, a reader 178 is provided in place of the mode selection switch 171 (see FIG. 3) of the fastening tool 1 and electrically connected to the controller 28. Although not shown, each of the nose assemblies 6A and 6B has a well-known electronic tag (also referred to as an IC tag, an RF tag or a wireless tag) in which respective identification information is stored. The reader 178 has a well-known structure capable of reading the identification information stored in the electronic tag in a non-contact manner, for example, by utilizing radio wave.

In the present modification, when the nose assembly 6A or 6B is mounted to the outer housing 11 via the nose-holding part 69, the electronic tag enters a communication range of the reader 178 and then the reader 178 reads the identification information stored in the electronic tag and outputs a signal corresponding to the identification information. The controller 28 selectively switches the operation mode based on the output signal of the reader 178, and controls operation of the driving mechanism 4 via the motor 20 like in the above-described embodiment.

Specifically, when determining that the nose assembly 6A is mounted, based on the output signal of the reader 178, the controller 28 completes the fastening process by breaking the pin 80. When determining that the nose assembly 6B is mounted, the controller 28 completes the fastening process based on the result of comparison between the driving current value and the threshold.

As the structure for detecting the type of the nose assembly 6 mounted to the housing 10, a contact switch may be employed in place of the reader 178 which is configured to read the identification information stored in the electronic tag in a non-contact manner.

Further, when the second mode is selected, in place of the driving current value used to determine completion of swaging, another physical quantity which corresponds to the driving state of the motor 20 (specifically, the load on the motor 20) may be adopted. For example, an internal resistance or a voltage drop of the battery, may be adopted. In such a modification, in place of the current detecting amplifier 285, any structure capable of detecting the adopted physical quantity may be employed.

Correspondences between the features of the above-described embodiment and the modifications and the features of the invention are as follows. Each of the fasteners 8 and 9 is an example that corresponds to the "fastener" according to the present invention. The fasteners 8 and 9 respectively correspond to the "breakage type fastener" and the "non-breakage type fastener". Each of the pins 80 and 90 is an example that corresponds to the "pin" according to the present invention. Each of the shaft parts 81 and 91 is an example that corresponds to the "shaft part", and each of the heads 83 and 93 is an example that corresponds to the "head", according to the present invention. The small-diameter part 811 and the pintail 812 are examples that correspond to the "small-diameter part" and the "pintail", respectively, according to the present invention. The rear end portion of the shaft part 91 is an example that corresponds to the "end region" according to the present invention. Each of the collars 85 and 95 is an example that corresponds to the "collar" according to the present invention. The workpiece W is an example that corresponds to the "workpiece" according to the present invention.

The fastening tool 1 is an example that corresponds to the "fastening tool" according to the present invention. The axis A1 is an example that corresponds to the "axis" according to the present invention. The anvil 61 (each of the anvils 61A and 61B) is an example that corresponds to the "anvil" according to the present invention. The pin-gripping part 65 (each of the pin-gripping parts 65A and 65B) is an example that corresponds to the "pin-gripping part" according to the present invention. The driving mechanism 4 is an example that corresponds to the "driving mechanism" according to the present invention. The ball-screw mechanism 40, the screw shaft 46 and the nut 41 are examples that correspond to the "ball-screw mechanism", the "screw shaft" and the "nut", respectively, according to the present invention. The motor 20 is an example that corresponds to the "motor" according to the present invention. The controller 28 is an example that corresponds to the "control part" according to the present invention. The housing 10 (the outer housing 11 and the inner housing 12) is an example that corresponds to the "housing" according to the present invention. The current detecting amplifier 285 is an example that corresponds to the "driving-state detecting part" according to the present invention.

The internal passage 662, the collection passage 700 and the opening 117 are examples that correspond to the "internal passage", the "collection passage" and the "outlet", respectively, according to the present invention. Each of the collection containers 7 and 701 is an example that corresponds to the "collection container" according to the present invention. The container connection part 13 is an example that corresponds to the "container connection part" according to the present invention. Each of the container detecting switch 70 and the container detection sensor 791 is an example that corresponds to the "container detecting part" according to the present invention. Each of the mode selection switch 171 and the setting dial 175 is an example that corresponds to the "operation member" according to the present invention. The reader 178 is an example that corresponds to the "type detecting part" according to the present invention.

In view of the nature of the present invention, the above-described embodiment and its modifications, the following features can be provided. Any one of the features can be employed alone, or in combination with any one of the fastening tool 1 of the embodiment, the above-described modifications, and the claimed invention.

(Aspect 1)

The control part may apply a specified pulling force, which is larger than a force required to swage the collar to the groove and large enough to break the shaft part at the small-diameter part, to the pin-gripping part via the driving mechanism, when the first mode is selected, and thereafter complete the fastening process by terminating movement of the pin-gripping part in the first direction relative to the anvil.

According to the present aspect, the control part can complete the fastening process in the first mode at appropriate timing by setting the specified pulling force.

(Aspect 2)

In aspect 1, the control part may move, via the driving mechanism, the pin-gripping part relative to the anvil in the first direction to a specified position in which a pulling force larger than the specified pulling force can be applied to the pin-gripping part.

According to the present aspect, the control part can complete the fastening process in the first mode at appropriate timing by setting the specified position.

(Aspect 3)

The driving state of the motor may be a driving current value of the motor.

According to the present aspect, close output management can be performed by effectively utilizing the fact that the driving current of the motor increases as swaging of the collar to the shaft part nears completion.

(Aspect 4)

In aspect 3, the control part may complete the fastening process by terminating movement of the pin-gripping part in the first direction relative to the anvil when the second mode is selected and the driving current value exceeds a specified threshold.

According to the present aspect, the control part can complete the fastening process in the second mode at appropriate timing by setting the specified threshold for the driving current of the motor.

(Aspect 5)

When the first mode is selected, after completing the fastening process, the control part may move, via the driving mechanism, the pin-gripping part in the second direction relative to the anvil while the pintail is allowed to be released from the pin-gripping part. Further, when the second mode is selected, after completing the fastening process, the control part may move, via the driving mechanism, the pin-gripping part gripping the end region in the second direction relative to the anvil, thereby releasing the collar swaged to the shaft part from the anvil and allowing the end region to be released from the pin-gripping part.

According to the present aspect, in both the first and second modes, the control part can return the pin-gripping part to the initial state, in order to be prepared for the next fastening process after completion of the fastening process.

(Aspect 6)

The driving mechanism may include a ball-screw mechanism having a screw shaft and a nut. The screw shaft may extend along the axis and is held to be movable along the axis while its rotation around the axis is restricted. The nut may be supported by the housing so as to be rotatable around the axis while its movement in an extending direction of the axis is restricted, and configured to be rotationally driven by the motor to move the screw shaft relative to the housing along the axis. The pin-gripping part may be directly or indirectly connected to the screw shaft. The fastening mechanism may further include thrust rolling bearings that are respectively provided on the first direction side and the second direction side of the nut and that are each configured to receive an axial force in the axis direction which is transmitted from the pin-gripping part to the nut via the screw shaft while allowing the nut to rotate.

According to the present aspect, the thrust rolling bearing provided on the second direction side of the nut can reliably receive a strong axial force transmitted from the pin-gripping part to the screw shaft via the nut when swaging the collar by moving the pin-gripping part in the first direction relative to the anvil, thereby avoiding the risk that the axial force may impede rotation of the nut. Further, the thrust rolling bearing provided on the first direction side of the nut can reliably receive a strong axial force transmitted from the pin-gripping part to the nut via the screw shaft when releasing the collar swaged to the shaft part from the anvil by moving the pin-gripping part in the second direction relative to the anvil in the second mode, thereby avoiding the risk that the strong axial force may impede rotation of the nut.

Further, as for the fastening tool of a type in which a fastening process is completed by breaking the pin, following aspects 7 to 15 are provided, for the purpose of providing a collection container for a pintail which is capable of more flexibly meeting user's needs. Any one or more of the following features can be employed alone or in combination with each other. Further, any one or more of the following features can be employed in combination with any one of the fastening tool 1 of the above-described embodiment, the modifications, the invention defined in aspects 1 to 6, and the claimed invention.

(Aspect 7)

A fastening tool configured to fasten a workpiece via a fastener, the fastener including a pin and a cylindrical part through which the pin is inserted, the pin having a shaft part and a head, the shaft part having a small-diameter part for breakage, the head being integrally formed on one end of the shaft part, the fastening tool being configured to complete a fastening operation by breaking the pin at the small-diameter part and comprising:

a housing;

an abutment part that is held by the housing and configured to abut on the cylindrical part;

a pin-gripping part that has an internal passage into which a pintail can be inserted, that is held by the abutment part so as to be movable along a specified axis relative to the abutment part and configured to grip a portion of the pintail inserted into the internal passage, the pintail comprising a region of the shaft part on a side opposite to the head across the small-diameter part;

a driving mechanism that is at least partially housed in the housing and configured to move the pin-gripping part along the axis in a specified direction relative to the abutment part so as to pull the pin gripped by the pin-gripping part in the axis direction and deform the cylindrical part abutting on the abutment part, thereby fastening the workpiece via the fastener and breaking the pin at the small-diameter part;

a collection passage that communicates with the internal passage and extends to an outlet formed in the housing and that is configured to allow passage of the pintail separated by breakage of the pin; and a collection container that is mounted to the housing such that an internal space of the collection container communicates with the collection passage and configured to store the pintail, wherein:

the collection container is configured such that its capacity is variable.

In the fastening tool according to the present aspect, a user can change the capacity of the collection container according to his/her own needs since the capacity of the collection container for the pintail is variable. For example, when desiring to reduce the frequency of discharging the pintails from the collection container, the user may increase the capacity of the collection container. On the other hand, for example, when using a relatively small number of the fasteners, the user need not increase the capacity of the collection container. Thus, according to the present aspect, the fastening tool is provided having the collection container for the pintail which is capable of more flexibly meeting user's needs.

It is noted that the fastener which can be used for the fastening tool of the present aspect may include a so-called multi-piece swage type fastener and a blind rivet (or called a blind fastener).

In the multi-piece swage type fastener, the pin and the cylindrical part (also referred to as a collar) through which the pin is inserted are originally formed separately from each other. The multi-piece swage type fastener is of a type in which a workpiece is clamped between the head of the pin and the cylindrical part swaged to the shaft part of the pin. In the blind rivet, the pin and the cylindrical part (also referred to as a rivet body or a sleeve) are integrally formed with each other. A flange is integrally formed on one end of the cylindrical part. Typically, the shaft part of the pin extends through the cylindrical part and protrudes long from one end side of the cylindrical part on which the flange is formed, and the head of the pin protrudes so as to be adjacent to the other end of the cylindrical part. The blind rivet is a fastener of a type in which a workpiece is clamped between the flange on one end of the cylindrical part and the other end of the cylindrical part which is deformed to be enlarged in diameter when the pin is pulled in the axial direction. In the both types, a small-diameter part for breakage is formed in the shaft part of the pin, and the operation of fastening the workpiece is completed when the pin is strongly pulled in the axial direction and broken at the small-diameter part.

In the above-described embodiment, the fastening tool 1 is configured as a common type which can use both of the breakage type fastener 8 and the non-breakage type fastener 9, but the fastening tool 1 may be configured to use only the breakage type fastener 8. In this case, the fastening tool 1 need not be provided with a structure for selectively switching the operation mode. Specifically, the controller 28 may be configured to always perform the operation which is performed in the first mode in the above-described embodiment.

The fastening tool 1 may be modified into a structure which can use a blind rivet. The blind rivet has a pin, which includes a shaft part having a small-diameter part for breakage and a head, and a cylindrical part (also referred to as a rivet body or a sleeve), which is integrally formed with the pin. In order to fasten a workpiece by using the blind rivet, the cylindrical part is deformed by pulling the pin in the axial direction, but the cylindrical part is not swaged to the shaft part. In order to use the blind rivet, the nose assembly 6A may be modified into a known nose assembly structure for the blind rivet. In this case, typically, the pin-gripping part 65A may have a similar structure as the above-described embodiment. The anvil 61A may be typically configured to abut on a flange formed on the cylindrical part to press the flange against the workpiece, without receiving the cylindrical part within its bore.

A typical example of a workpiece which is suitable to be fastened using the fastener of the present aspect may include a metal member requiring fastening strength. Therefore, the fastening tool of the present aspect can be suitably used, for example, in a process of manufacturing transport equipment such as an aircraft and an automobile and in a process of installing a solar panel or equipment of a plant.

The housing may also be referred to as a tool body. The housing may have a one-layer structure or a two-layer structure. The housing of one-layer structure may be formed by connecting a plurality of parts. The housing of two-layer structure may typically include an outer housing part which forms an outer shell of the fastening tool and an inner housing part which is at least partially housed in the outer housing and houses at least part of internal components. In the case of the two-layer structure, the outer housing part and the inner housing part may be formed by connecting a plurality of parts.

The structure of the abutment part is not particularly limited as long as the abutment part is configured to abut on the cylindrical part. For example, in the case of using the multi-piece swage type fastener, the abutment part may be configured as an anvil (metal anvil) capable of deforming the cylindrical part (collar) by a swaging force. Further, for example, in the case of using the blind rivet, the abutment part may be configured to abut on and press the flange of the cylindrical part (rivet body or sleeve). In the both cases, any known structure can be adopted. The abutment part may be held by the housing by being connected to the housing directly or via a separate member. Further, the abutment part may be configured to be removably mounted to the housing.

The structure of the pin-gripping part is not particularly limited as long as the pin-gripping part is configured to be held by the abutment part so as to be movable along the specified axis relative to the abutment part and to grip a portion of the pintail inserted into the internal passage. For example, in either case of using the multi-piece swage type fastener or the blind rivet, any known structure can be employed which includes a plurality of claws (also referred to as a jaw), which is configured to grip a portion of the pintail, and a holding body, which is configured to hold the claws. Typically, the pin-gripping part may be coaxially arranged with the anvil within the bore of the anvil.

As the driving mechanism, any structure can be adopted which is capable of moving the pin-gripping part along the axis in a specified direction relative to the abutment part. For example, when an electric motor is used as a driving source, the driving mechanism may be configured to finally convert rotation of the motor into linear motion of the pin-gripping part in the axis direction. Specifically, for example, the driving mechanism may mainly include a ball-screw mechanism having a screw shaft and a nut. In this case, the pin-gripping part may be directly or indirectly connected to the screw shaft so as to be movable in the axis direction together with the screw shaft. Apart from the ball-screw mechanism, for example, a rack and pinion mechanism may also be adopted. Alternatively, for example, as the driving mechanism, a structure including a fluid pressure cylinder utilizing air pressure or oil pressure may be adopted.

The collection passage may extend in any direction from the internal passage of the pin-gripping part to the outlet of the housing. In view of smooth discharge of the pintail, however, it may be preferred that the collection passage extends substantially straight. The collection passage may preferably be surrounded by a wall, but need not necessarily be surrounded in its entirety in the circumferential direction over the whole length. Further, the diameter of the collection passage need not necessarily be uniform over the whole length.

The collection container may be fixed to the housing or may be configured to be mounted to/dismounted from the housing. The shape and size of the collection container are not particularly limited. As a structure for making the capacity variable, for example, a structure including a plurality of members which can be selectively connected to each other, and a telescopic structure can be adopted. Further, the variable range of the capacity may include a range being zero.

(Aspect 8)

In aspect 7, the collection passage may be connected at its front end to the internal passage and extend rearward from the front side of the fastening tool along the axis to the outlet formed in the rear end portion of the housing. The collection container may be configured to be removably mounted to the rear end portion of the housing so as to cover the outlet. According to the present aspect, the collection passage linearly extends along the axis so that the pintail can be smoothly discharged therethrough. Further, the collection container which is removably mounted to the rear end portion of the housing can be easily mounted/dismounted, compared with a case of the collection container disposed on an intermediate portion of the housing.

(Aspect 9)

In aspect 8, the collection container may include a plurality of cylindrical members and a lid member. Each of the cylindrical members may have a hollow cylindrical shape. Further, the cylindrical members may be configured to be connected to each other such that their internal spaces communicate with each other, and at least one of the cylindrical members may be configured to be mountable to/dismountable from the housing. The lid member may be configured to be mountable to/dismountable from each of the cylindrical members.

According to the present aspect, when desiring to minimize the capacity of the collection container, a user may mount to the housing one of the cylindrical members which is mountable to/dismountable from the housing, and mount the lid member to the cylindrical member. On the other hand, when desiring to increase the capacity of the collection container, the user may connect another cylindrical member to the cylindrical member mounted to the housing and further mount the lid member. Thus, the user can change the capacity of the collection container in a simple manner. Further, in a case where all of the cylindrical members are each mountable to/dismountable from the housing, it is not necessary for the user to select the cylindrical member to be mounted to the housing, so that the collection container can be more readily mounted. All of the cylindrical members may be the same or different in at least one of the shape, capacity and material. Further, only one or two or more of the cylindrical members may be removably mounted to the housing. The manner of mounting/dismounting the cylindrical member to/from the housing and the manner of mounting/dismounting the lid member to/from the cylindrical member are not particularly limited. For example, threaded engagement and engagement between a projection and a recess may be adopted.

(Aspect 10)

In aspect 9, the housing may include a container connection part which is provided around the outlet. Each of the cylindrical members may include a first connection part and a second connection part which are respectively provided in both end portions in the axial direction thereof. Further, the lid member may have a bottomed cylindrical shape and include a third connection part formed on its open end portion. A male thread or a female thread may be formed in the container connection part. The first connection part is formed with a female thread or a male thread which can be threadedly engaged with the male thread or the female thread of the container connection part, and the second connection part may be formed with a male thread or a female thread having a same shape as a shape of the container connection part. The third connection part may be formed with a female thread or a male thread having the same shape as that of the first connection part. It is noted that the "thread having the same shape" herein refers to a thread having the same pitch and diameter and having a screw thread of the same angle.

According to the present aspect, each of the cylindrical members can be connected either to the container connection part or to the second connection part of another cylindrical member via the first connection part. Further, the lid member can be mounted either to the container connection part or to the second connection part of each of the cylindrical members via the third connection part. Therefore, a user can just connect the cylindrical members without worrying about the connecting order after determining the number of the cylindrical members to be used according to a desired capacity of the collection container. Further, when it is not necessary to use the collection container (for example, when stored), the whole length of the fastening tool in the axis direction can be shortened by mounting only the lid member to the housing.

(Aspect 11)

In aspect 7 or 8, the collection container may include a first member and a second member. The first member may have a hollow cylindrical shape and is configured to be mountable to/dismountable from the housing. The second member may have a bottomed cylindrical shape and may be connected to the first member so as to be movable at least in the axial direction of the first member relative to the first member. The first and second members may be configured to be locked to each other at any one of locking positions in the axial direction of the first member.

According to the present aspect, a user can change the capacity of the collection container in such a simple manner of mounting the first member to the housing, moving the second member relative to the first member in the axial direction and locking the second member to the first member at any one of the locking positions. It is noted that a structure for locking the second member to the first member is not particularly limited. For example, a combination of a projection and a recess and a combination of a male thread and a female thread may be adopted. The locking positions herein may be located apart from each other or located contiguously adjacent to each other. For example, in the former case, the locking positions may be provided in multistep in the axial direction, and in the latter case, the locking positions may be steplessly provided in the axial direction.

(Aspect 12)

In aspect 10 or 11, the fastening tool may further include a handle part which is connected to the housing so as to protrude in a direction crossing the axis and configured to be held by a user. An axis of rotation of the collection container relative to the housing may be offset in a protruding direction of the handle part from the axis.

Generally, in order to make it possible to use the fastening tool even in a narrow space (for example, a corner enclosed by walls), it may be desirable to reduce a center height of the fastening tool as much as possible. The center height in the fastening tool refers to the distance from the axis to an outer surface (upper surface) of the housing on the side opposite to the side to which the handle part protrudes. For the same reason, it may be desirable that the collection container mounted to the rear end portion of the housing does not protrude upward from the upper surface of the housing. According to the present aspect, with the structure in which the rotation axis of the collection container is offset in the protruding direction of the handle part from the axis, the radius of the collection container can be increased and thus the internal space for storing the pintail can be expanded, while the center height is reduced to a desirable height.

(Aspect 13)

In any one of aspects 7 to 12, the fastening tool may further include a container detecting part configured to detect the collection container. According to the present aspect, by utilizing the detection result of the container detecting part, processing such as indicating by light, sound or image and prohibiting driving of the driving mechanism can be appropriately performed when the collection container is not mounted. Thus, the pintail can be prevented from being discharged from the outlet to the outside when not intended by a user. It is noted that the structure of the container detecting part is not particularly limited. For example, a contact switch which is configured to be turned on by contact with the collection container, and a non-contact sensor such as a magnetic proximity sensor and a photoelectric sensor may be adopted.

(Aspect 14)

In any one of aspects 7 to 13, the cylindrical members may have the same shape.

According to the present aspect, when mounting/dismounting the cylindrical member to/from the housing and connecting the cylindrical members, it is not necessary for a user to distinguish the cylindrical members from each other, so that the labor of mounting/dismounting can be minimized. Further, all the cylindrical members can be manufactured by using the same mold, so that the manufacturing cost can be reduced.

(Aspect 15)

In any one of aspects 7 to 14, the rotation axis of the collection container may be offset in a first direction relative to the axis. In a second direction opposite to the first direction, the distance from the axis to an outer surface of the housing may be shorter than the distance from the rotation axis to an outer surface of the collection container. The outer surface of the collection container may be arranged substantially in the same position as the outer surface of the housing in the second direction.

According to the present aspect, the collection container does not protrude from the housing in a center height direction (second direction), so that a usable range of the fastening tool in a narrow space (for example, a corner enclosed by a wall) can be more reliably secured.

DESCRIPTION OF THE NUMERALS 1, 101: fastening tool, 10: housing, 11: outer housing, 111: driving-mechanism housing part, 113: motor housing part, 113A: outlet, 113B: inlet, 115: controller housing part, 117: opening, 117A: rib, 118: guide tube, 118A: through hole, 118B: flange, 119: opening, 12: inner housing, 122: guide plate, 123: guide hole, 124: guide sleeve, 125: nose connection part, 126: nut housing part, 127: opening, 13: container connection part, 15: handle part, 150: trigger, 151: switch, 171: mode selection switch, 173: LED lamp, 175: setting dial, 178: reader, 18: battery mounting part, 19: battery, 20: motor, 21: motor shaft, 23: fan, 28: controller, 281: three-phase inverter, 283: Hall sensor, 285: current detecting amplifier, 3: transmitting mechanism, 31: planetary gear mechanism, 32: sun gear, 33: carrier, 34: output shaft, 35: bevel gear, 36: intermediate shaft, 37: bevel gear, 38: nut driving gear, 4: driving mechanism, 40: ball-screw mechanism, 411: driven gear, 412: radial rolling bearing, 413: radial rolling bearing, 415: thrust rolling bearing, 416: thrust rolling bearing, 41: nut, 46: screw shaft, 461: through hole, 463: roller shaft, 464: roller, 466: thrust washer, 467: thrust washer, 47: extension shaft, 471: through hole, 48: position detecting mechanism, 481: initial-position sensor, 482: rearmost-position sensor, 485: magnet holding arm, 486: magnet, 5: connection mechanism, 51: first connection part, 511: guide rib, 52: second connection part, 521: front wall, 53: third connection part, 531: body, 532: locking flange, 54: fourth connection part, 55: coil spring, 6, 6A, 6B: nose assembly, 61, 61A, 61B: anvil, 620, 630: open end, 621, 631: bore, 622, 632: tapered part, 623: guide part, 633: gripping-claw guide part, 634: base guide part, 625, 635: locking rib, 628: recess, 65, 65A, 65B: pin-gripping part, 660: open end, 661: bore, 662: internal passage, 671: gripping claw, 672: base part, 69: nose-holding part, 691: inner sleeve, 692: anvil locking part, 693: flange, 695: outer sleeve, 696: small-diameter part, 697: front end part, 698: large-diameter part, 7, 701: collection container, 70: container detecting switch, 71: cylindrical member, 713: first connection part, 715: second connection part, 75: lid member, 753: third connection part, 702: first member, 703: connection part, 704: locking groove, 705: guide part, 706: locking part, 707: second member, 708: locking projection, 700: collection passage, 791: container detection sensor, 792: magnet, 8, 9: fastener, 80, 90: pin, 81, 91: shaft part, 811: small-diameter part, 812: pintail, 813, 913: pulling groove, 816: base part, 817: swaging groove, 83, 93: head, 85, 95: collar, 851, 951: flange, 852, 952: engagement part, 86, 96: hollow part, A1: axis, A2: rotation axis, CH: center height, W: workpiece, W1: mounting hole

The invention claimed is:

1. A fastening tool configured to fasten a workpiece via a multi-piece swage type fastener, the fastener including a pin and a hollow cylindrical collar, the pin including a shaft part and a head, the shaft part having a swaging groove, the head being integrally formed on one end of the shaft part, the collar being engageable with the shaft part, the fastening tool comprising:

an anvil configured to be engaged with the collar;
a pin-gripping part configured to grip the shaft part of the pin, the pin-gripping part being held by the anvil so as to be movable relative to the anvil along a specified axis;
a driving mechanism configured to move the pin-gripping part relative to the anvil along the axis;
an electric motor configured to drive the driving mechanism;
a control part configured to control operation of the driving mechanism via the motor; and
a housing configured to hold the anvil, the motor, the control part, and at least a portion of the driving mechanism being housed in the housing, wherein:

the driving mechanism is configured to move the pin-gripping part relative to the anvil in a first direction along the axis so as to cause the anvil to press the collar engaged with the shaft part in a second direction opposite to the first direction and in a radially inward direction of the collar, thereby swaging the collar to the groove and fastening the workpiece by the head and the collar, and
an operation mode of the driving mechanism can be selectively switched between a plurality of operation modes, the operation modes including a first mode in which a process of fastening the workpiece is completed based on a state of the fastener and a second mode in which the process of fastening the workpiece is completed based on a driving state of the motor.

2. The fastening tool as defined in claim 1, wherein:

the first mode is an operation mode for a breakage type fastener of which the shaft part has a small-diameter part for breakage, and
when the first mode is selected, the fastening process is completed when the pin is broken at the small-diameter part while a pintail is gripped by the pin-gripping part and separated from the pin, the pintail comprising a region of the shaft part on a side opposite to the head across the small-diameter part, and
the second mode is an operation mode for a non-breakage type fastener of which the shaft part does not have a small-diameter part for breakage, and
when the second mode is selected, the fastening process is completed while an end region of the shaft part remains gripped by the pin-gripping part and integrated with an other region of the shaft part.

3. The fastening tool as defined in claim 2, further comprising:

a driving-state detecting part configured to detect the driving state of the motor, wherein:
the control part is configured to control the motor based on the driving state detected by the driving-state detecting part only when the second mode is selected, and thereby terminate a movement of the pin-gripping part in the first direction relative to the anvil via the driving mechanism to complete the fastening process.

4. The fastening tool as defined in claim 2, further comprising:
   a collection passage communicating with an internal passage and extending to an outlet formed in the housing, the internal passage being formed along the axis within the pin-gripping part, the separated pintail being capable of passing through the collection passage;
   a container connection part provided around the outlet and configured such that a collection container is removably mounted thereto, the collection container being configured to store the pintail; and
   a container detecting part configured to detect the collection container via the container connection part at least when the first mode is selected.

5. The fastening tool as defined in claim 4, wherein:
   the driving mechanism includes a ball-screw mechanism, the ball-screw mechanism includes:
   a screw shaft extending along the axis and held to be movable along the axis while rotation around the axis is restricted; and
   a nut supported by the housing so as to be rotatable around the axis while movement in an extending direction of the axis is restricted, the nut being configured to be rotationally driven by the motor to move the screw shaft relative to the housing along the axis,
   the pin-gripping part is directly or indirectly connected to the screw shaft,
   the collection passage extends rearward from a front side of the fastening tool along the axis and at least partially extend within the screw shaft, and
   the outlet is formed in a rear end portion of the housing.

6. The fastening tool as defined in claim 2, wherein:
   the anvil and the pin-gripping part form a nose assembly corresponding to a type of the fastener, and
   the housing is configured such that a selected one of a nose assembly for the breakage type fastener and a nose assembly for the non-breakage type fastener is removably mounted to the housing.

7. The fastening tool as defined in claim 6, further comprising:
   a type detecting part configured to detect the type of the nose assembly mounted to the housing, and
   the control part is configured to control operation of the driving mechanism according to the operation mode corresponding to the type of the nose assembly detected by the type detecting part.

8. The fastening tool as defined in claim 2, wherein the control part is configured to apply a specified pulling force, which is larger than a force required to swage the collar to the groove and large enough to break the shaft part at the small-diameter part, to the pin-gripping part via the driving mechanism, when the first mode is selected, and thereafter complete the fastening process by terminating movement of the pin-gripping part in the first direction relative to the anvil.

9. The fastening tool as defined in claim 8, wherein the control part is configured to move, via the driving mechanism, the pin-gripping part relative to the anvil in the first direction to a specified position in which a pulling force larger than the specified pulling force can be applied to the pin-gripping part.

10. The fastening tool as defined in claim 1, further comprising:
    an operation member configured to select any one of the operation modes according to external operation, wherein:
    the control part is configured to control operation of the driving mechanism according to the operation mode selected via the operation member.

11. The fastening tool as defined in claim 10, wherein:
    the operation member is configured to set, in addition to selecting the operation mode, a threshold relating to the driving state of the motor as a condition of completion of the fastening process in the second mode,
    the control part is configured to control the motor based on a result of comparison between the threshold set via the operation member and the driving state, when the second mode is selected, and thereby cause the driving mechanism to terminate movement of the pin-gripping part in the first direction relative to the anvil.

12. The fastening tool as defined in claim 1, wherein the driving state of the motor is a driving current value of the motor.

13. The fastening tool as defined in claim 12, wherein the control part is configured to complete the fastening process by terminating the movement of the pin-gripping part in the first direction relative to the anvil when the second mode is selected and the driving current value exceeds a specified threshold.

* * * * *